United States Patent
Yoshida

(10) Patent No.: US 8,843,374 B2
(45) Date of Patent: Sep. 23, 2014

(54) VOICE RECORDING FOR ASSOCIATION WITH A DOT PATTERN FOR RETRIEVAL AND PLAYBACK

(76) Inventor: Kenji Yoshida, Tokyo (JP)

( * ) Notice: Subject to any disclaimer, the term of this patent is extended or adjusted under 35 U.S.C. 154(b) by 1301 days.

(21) Appl. No.: 11/914,917

(22) PCT Filed: May 19, 2006

(86) PCT No.: PCT/JP2006/310501
§ 371 (c)(1),
(2), (4) Date: Nov. 19, 2007

(87) PCT Pub. No.: WO2006/123837
PCT Pub. Date: Nov. 23, 2006

(65) Prior Publication Data
US 2009/0094034 A1 Apr. 9, 2009

(30) Foreign Application Priority Data

May 19, 2005 (JP) .................................. 2005-147084
Apr. 28, 2006 (WO) .................. PCT/JP2006/309521

(51) Int. Cl.
*G10L 21/00* (2013.01)
*G10L 25/00* (2013.01)
*G10L 21/06* (2013.01)
*G11B 27/034* (2006.01)
*G10L 13/04* (2013.01)
*G11B 27/00* (2006.01)
*G11B 27/10* (2006.01)
*G11B 20/00* (2006.01)
*G11B 33/10* (2006.01)
*G11B 20/10* (2006.01)

(52) U.S. Cl.
CPC .... *G11B 27/034* (2013.01); *G11B 2020/10546* (2013.01); *G10L 13/043* (2013.01); *G11B 27/00* (2013.01); *G11B 27/105* (2013.01); *G11B 20/00* (2013.01); *G11B 33/10* (2013.01); *G11B 2220/17* (2013.01)
USPC .............................. 704/270; 704/271; 704/272

(58) Field of Classification Search
None
See application file for complete search history.

(56) References Cited

U.S. PATENT DOCUMENTS 5,059,126 A * 10/1991 Kimball ........................ 434/308
5,839,108 A   11/1998 Daberko et al.

(Continued)

FOREIGN PATENT DOCUMENTS

JP    2003 67121 A1    3/2003
WO    2004 029871 A1   4/2004

OTHER PUBLICATIONS

International Preliminary Report on Patentability dated Nov. 19, 2007, Application No. PCT/JP2006/310501.

(Continued)

*Primary Examiner* — Jesse Pullias
(74) *Attorney, Agent, or Firm* — Westerman, Hattori, Daniels & Adrian, LLP

(57) ABSTRACT

A link table is generated, voice information is associated by dot patterns, and then, voice information associated with the dot pattern is reproduced from a speaker when the dot pattern is read by means of a scanner. In this manner, the dot pattern is printed on a surface of a material such as a picture book or a card, making it possible to play back voice information corresponding to a pattern or a story of a picture book and to play back voice information corresponding to a character described on the card. In addition, by means of a link table, new voice information can be associated with, dissociated from, or changed to, a new dot pattern.

11 Claims, 37 Drawing Sheets

(56) References Cited

U.S. PATENT DOCUMENTS

| | | | |
|---|---|---|---|
| 5,852,803 A * | 12/1998 | Ashby et al. | 704/270 |
| 5,866,895 A * | 2/1999 | Fukuda et al. | 235/494 |
| 5,896,403 A * | 4/1999 | Nagasaki et al. | 714/752 |
| 5,905,250 A * | 5/1999 | Fukuda et al. | 235/472.01 |
| 6,072,917 A | 6/2000 | Mori et al. | |
| 6,148,173 A * | 11/2000 | Bell | 434/309 |
| 6,397,184 B1 * | 5/2002 | Walker | 704/270 |
| 7,233,903 B2 * | 6/2007 | Raman et al. | 704/275 |
| 2002/0138273 A1 * | 9/2002 | Raman et al. | 704/270 |

OTHER PUBLICATIONS

European Search Report dated Aug. 11, 2008, issued in corresponding European Patent Application No. 06756601.8.

International Search Report of PCT/JP2006/310501, date of mailing Aug. 15, 2006.

* cited by examiner

FIG. 10

| | | LINK | | |
|---|---|---|---|---|
| LABEL (SEQUENTIAL ORDER OF REGISTRATION) | VOICE FILE TRACK No. | DOT CODE (32bit) | | |
| 1 | 3 | 1100001 | 1100002 | - |
| 2 | 7 | 1100004 | - | - |
| 3 | 8 | 1100005 | 1100009 | 1100010 |
| 4 | 4 | 1100003 | - | - |
| ≀ | ≀ | ≀ | ≀ | ≀ |

(a)

| $I_3$ | $I_4$ | $I_5$ |
|---|---|---|
| $I_2$ | $I_1$ | $I_6$ |

2×3

(b)

| $I_3$ | $I_4$ | $I_5$ |
|---|---|---|
| $I_2$ | $I_1$ | $I_6$ |
| $I_9$ | $I_8$ | $I_7$ |

3×3

(c)

| $I_5$ | $I_6$ | $I_7$ |
|---|---|---|
| $I_4$ | $I_1$ | $I_8$ |
| $I_3$ | $I_2$ | $I_9$ |
| $I_{12}$ | $I_{11}$ | $I_{10}$ |

3×4

(d)

| $I_{36}$ | $I_{17}$ | $I_{18}$ | $I_{19}$ | $I_{20}$ | $I_{21}$ |
|---|---|---|---|---|---|
| $I_{35}$ | $I_{16}$ | $I_5$ | $I_6$ | $I_7$ | $I_{22}$ |
| $I_{34}$ | $I_{15}$ | $I_4$ | $I_1$ | $I_8$ | $I_{23}$ |
| $I_{33}$ | $I_{14}$ | $I_3$ | $I_2$ | $I_9$ | $I_{24}$ |
| $I_{32}$ | $I_{13}$ | $I_{12}$ | $I_{11}$ | $I_{10}$ | $I_{25}$ |
| $I_{31}$ | $I_{30}$ | $I_{29}$ | $I_{28}$ | $I_{27}$ | $I_{26}$ |

6×6

VOICE DETERMINATION TABLE

| CHARACTER CODE | ANGLE | ANGLE No. | VOICE ADDRESS |
|---|---|---|---|
| 0001 | -46~+45 | 001 | a |
| | +46~+135 | 002 | b |
| | +136~+225 | 003 | c |
| | +226~+315 | 004 | d |

VOICE RECORDING FOR ASSOCIATION WITH A DOT PATTERN FOR RETRIEVAL AND PLAYBACK

TECHNICAL FIELD

The present invention relates to an information input/output method employing a dot pattern, for outputting voice information by optically reading dot pattern information formed on a material such as a printed matter.

BACKGROUND ART

Conventionally, there has been proposed an information output method for reading a bar code printed on a material such as a printed matter, and then, reading out and outputting information such as a voice corresponding to this bar code from a memory. For example, there has been proposed a method for storing in advance information coincident with key information imparted to storing means, making a search from a key read by means of the bar code reader, and then, outputting information or the like. In addition, there has also been proposed a technique of generating a dot pattern in which fine dot patterns are arranged in accordance with a predetermined rule so that various voice information can be outputted; picking up the dot pattern printed on a material such as a printed matter as image data by means of a camera; digitizing the picked up data; and then, outputting voice information.

DISCLOSURE OF THE INVENTION

Problem(s) to be Solved by the Invention

However, the conventional methods for outputting a voice or the like by means of a bar code, as described above, have entailed a problem that the bar code printed on a material such as a printed matter is eyesore. In addition, the conventional methods have also entailed a problem that, if the bar code is thus large, it is impossible from the aspect of layout to clearly assign a number of bar codes by partial phrases and sentences and characters or objects having meanings appearing in photographs, pictures, or graphic images.

Further, the voice assigned to the bar code is fixed, and only the same voice information can be outputted in the case where the same bar code has been read.

The present invention has been achieved in order to solve such problems. In other words, it is a technical object of the present invention to propose a system such that a user can arbitrarily set/release a relationship (link) between a dot pattern and voice information, thereby making it possible to record voice information associated with an arbitrary dot pattern. In addition, it is a technical object to provide a voice information recording system that is capable of imparting a relationship therebetween, associating items of different voice information with each other by dot patterns, and playing back the same voice information in a plurality of different dot patterns by enabling setting/releasing of a relationship (link) between voice information and a dot pattern, thereby imparting flexibility to the relationship therebetween and associating items of voice information that are different from each other by dot patterns.

Means for Solving the Problem(s)

In order to solve the problems described above, the present invention has employed means described below.

Claim 1 of the present invention is directed to a voice information recording apparatus, comprising: voice information inputting means for inputting voice information; storing means for storing the inputted voice information; optical reading means for reading a dot pattern printed in advance; converting means for converting the dot pattern read by the optical reading means to code information/coordinate information; association instructing means for instructing the converted code information/coordinate information to be associated with the voice information; a link table for containing the associated code information/coordinate information and the voice information; and voice information reproducing means for reproducing the voice information by retrieving the voice information from the storing means associated by means of the link table after a dot pattern is read again by the optical reading means.

According to this voice information recording apparatus, while voice information is associated by dot patterns, when the dot pattern is read by optical reading means, the voice information associated with the dot patterns can be outputted from voice information reproducing means. In thus manner, while a dot pattern is printed on a surface of a material such as a picture book or a card, voice information corresponding to a pattern of the picture book or story can be reproduced or voice information corresponding to a character described on a card can be reproduced. In addition, by the association instructing means, voice information is newly associated with, released from, or changed to, a new dot pattern.

A dot pattern may be provided on any medium such as a name card, a notebook, or a seal in addition to the picture book or card mentioned previously.

In addition, a dot pattern may be code information corresponding to voice information stored in storing means or may be coordinate information. In the case where the dot pattern is code information, voice information recorded in an address corresponding to code information can be reproduced. In the case where the dot pattern is coordinate information, voice information corresponding to a position (coordinate information) read by the optical reading means can be reproduced.

Claim 2 of the present invention is directed to the voice information recording apparatus according to claim 1, wherein the link table associates plural items of code information/coordinate information with one item of voice information.

One item of voice information is thus associated with a plurality of dot patterns, whereby, even in the case where a plurality of cards of different dot patterns have been read by the optical reading means, the same voice information can be reproduced.

Claim 3 of the present invention is directed to the voice information recording apparatus according to claim 1, wherein the storing means for storing the voice information is a card type storing medium.

A removable card type storing medium is mounted on the voice information recording apparatus, thereby making it possible to reproduce voice information that is different depending on card type storing medium. In addition, a correlation table and a correlation code are provided by this card type storing medium, thereby making it possible to change a condition for playing back voice information by card type storing medium. Specifically, specification can be provided such that, while correlation codes different depending on games are set, judgment is made as to whether to enable or disable reproduction of voice information in accordance with whether the correlation codes registered in a dot pattern are correct or not.

Claim 3 of the present invention is directed to the voice information recording apparatus as set forth in claim 1, characterized by comprising a printing medium on which the dot pattern that can be read by the optical reading means is printed in order to instruct at least starting input of the voice information; ending input of voice information; reproduction of voice information, and stopping reproduction.

Instructive entries such as starting input of voice information are made by reading a dot pattern, thereby making it possible to operate the voice information recording apparatus visually and intuitively in comparison with a case of making these entries by means of hardware switches.

Claim 4 of the present invention is directed to the voice information recording apparatus according to claim 1, further comprising independently of equipment main body, a printing medium having printed thereon a dot pattern that can be read by the optical reading means in order to instruct the starting of input of the voice information; termination of input of voice information; reproduction of voice information; stopping the reproduction of voice information and other voice information-related operations. optical reading association instructing The instruction for association and dissociation between a dot pattern and voice information is also carried out by reading a dot pattern, thereby making it possible to operate the voice information recording apparatus further visually and intuitively.

Claim 5 of the present invention is directed to the voice information recording apparatus according to claim 3, further comprising independently of equipment main body, a printing medium having printed thereon a dot pattern that can be read by the optical reading means as the association instructing means for instructing the associated or dissociated code information/coordinate information and the voice information optical reading association instructing.

The voice information recording apparatus is configured with the use of a printing medium (so called paper controller) on which such a dot pattern is printed, thereby enabling visible operation of the voice information recording apparatus by visualizing a printed portion.

Claim 6 of the present invention is directed to the voice information recording apparatus according to any one of claims 1 to 5, further comprising means for, in an image storing area for storing as pixels the dot pattern having an orientation depending on a positional relationship between the medial face and the optical reading means, the dot pattern being acquired by the optical readier means, calculating an angle formed by a positive X-direction or a positive Y-direction of an XY coordinate that is based on the pixels stored therein and an orientation of the dot pattern, the apparatus comprising means enabling reproduction of the voice information different depending on angle information in addition to the code information/coordinate information.

A dot pattern has an orientation depending on a positional relationship between a medial face and the optical reading means, and thus, is intended to output voice information different depending on orientations with reference to the fact.

Advantageous Effect of the Invention

According to the present invention, there can be provided a voice information recording apparatus that is capable of enabling recording of voice information associated with an arbitrary dot pattern and enabling setting/releasing of a relationship (link) between voice information and a dot pattern, thereby making it possible to associate voice information different depending on dot patterns or reproduce the same voice information in a plurality of different dot patterns.

BRIEF DESCRIPTION OF THE DRAWINGS

FIG. 10 is an illustrative view of a link table.

REFERENCE NUMERALS

Figure 1:
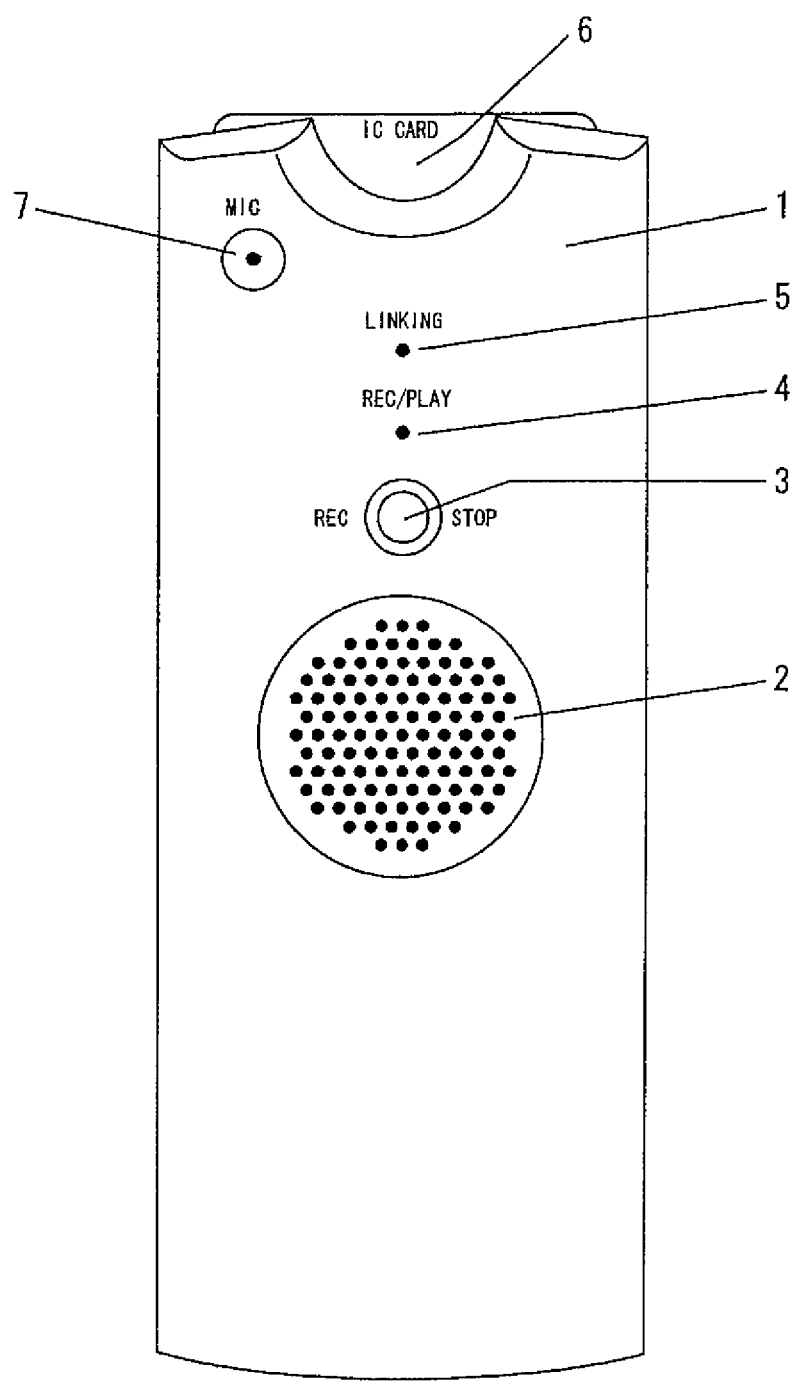
FIG. 1 is a front view (1) of a voice recorder.

1 Dot pattern
2 Key dot
3 Information dot
4 Grid dot
101, 1901, 3101 Voice recorder
   102, 1902, 3102 Speaker
103 Record/stop button
104 Recording/reproduction display portion
105 Link display portion
106 Memory card
107 Microphone
108 Power switch
109 Volume
110 Connector terminal
111 Voice output terminal
112 External power terminal
113 Scanner (optical reading means)
114 Cable
115 USB connector
116 Photograph
600 Instruction board
701 Index
702 Voice file track
1903 Sensor unit
1904, 3104 Scan button
1905 Record button
1906 Volume
1907 LED
1908, 2004, 3108 Microphone
2001 Cart
2002 Stage
2003 figure
2005 Liquid crystal display portion
2006, 3200 Paper controller
2801 Computer
3105 Record button
3109 Antenna

BEST MODE FOR CARRYING OUT THE INVENTION

Figure 2:
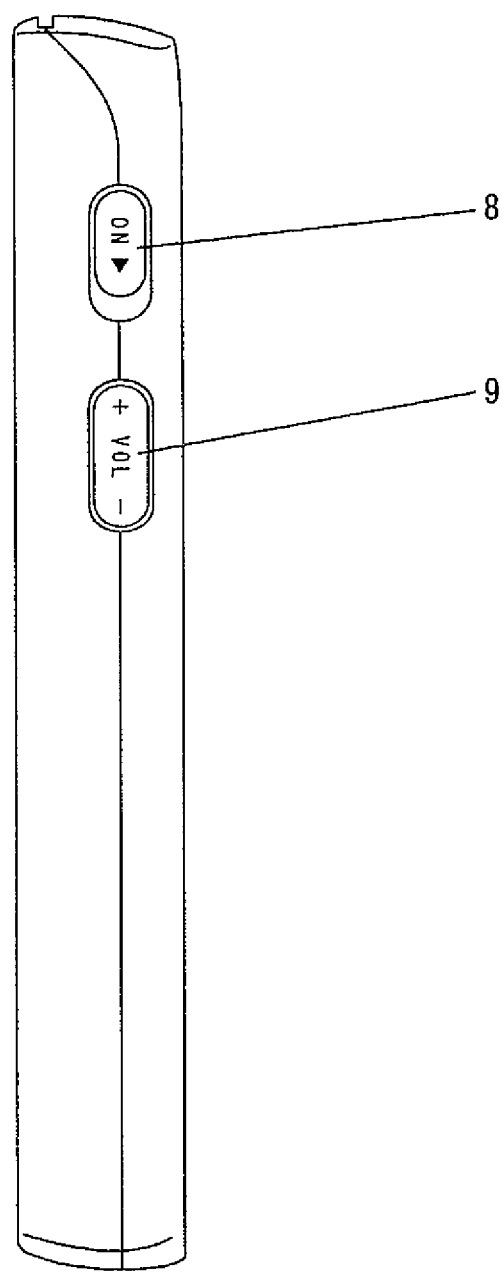
FIG. 2 is a left side view of a voice recorder.
Figure 3:
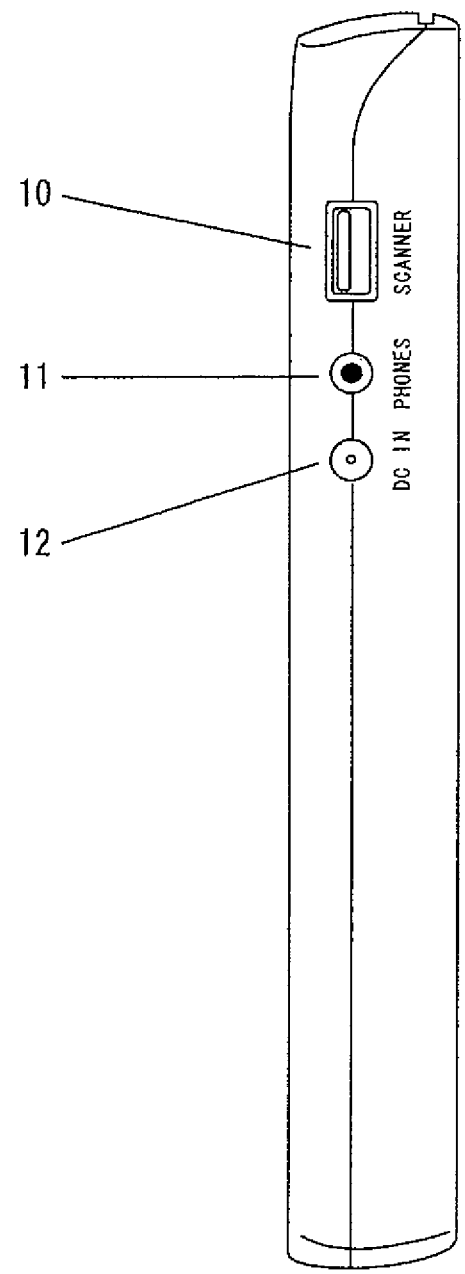
FIG. 3 is a right side view of a voice recorder.

FIG. 1 is a front view of a voice recorder (voice information recording apparatus) according to an embodiment of the present invention; FIG. 2 is a right side view thereof, and FIG. 3 is a left side view thereof.

In voice recorder 101, speaker 102 is provided on a cabinet surface thereof, enabling reproduction and output of voice information. Record/stop button 103, record reproduction display portion 104, and link display portion 105 are provided upwardly of speaker 102 and microphone 107 for voice information input is provided at the upper left thereof.

Figure 9:
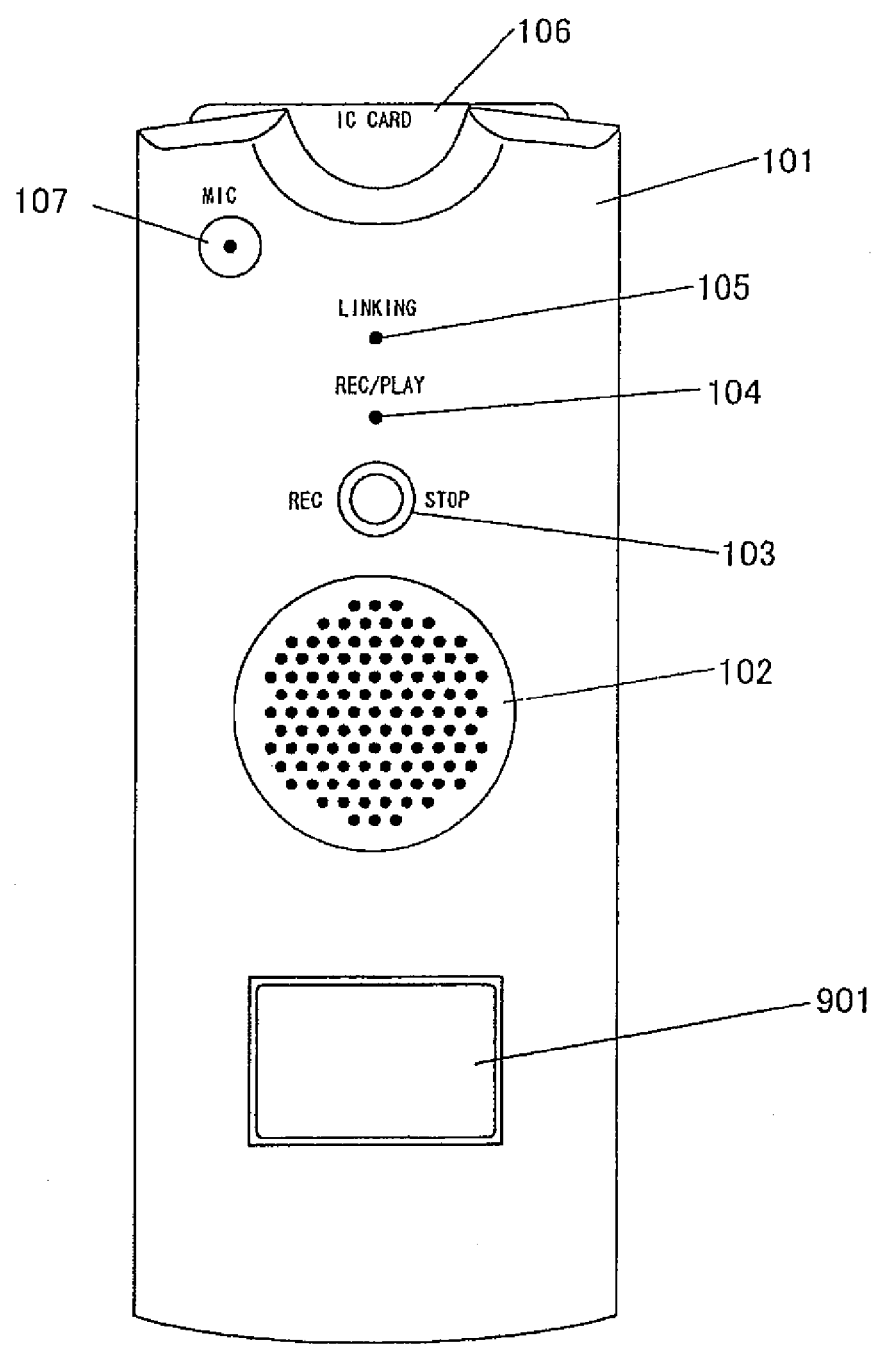
FIG. 9 is a front view (2) of a voice recorder.

Liquid crystal display portion 901 as shown in FIG. 9 may be provided on the cabinet surface of voice recorder 101. This liquid crystal display screen 901 is capable of displaying a recording state, a reproduction state, a stop state, a link stage, and recording/reproduction track number or the like.

Power switch 108 and volume 109 are laid out on the left side face of voice recorder 101, enabling power supply to voice recorder 101 and volume control of voice information to be reproduced from speaker 102.

Figure 4:
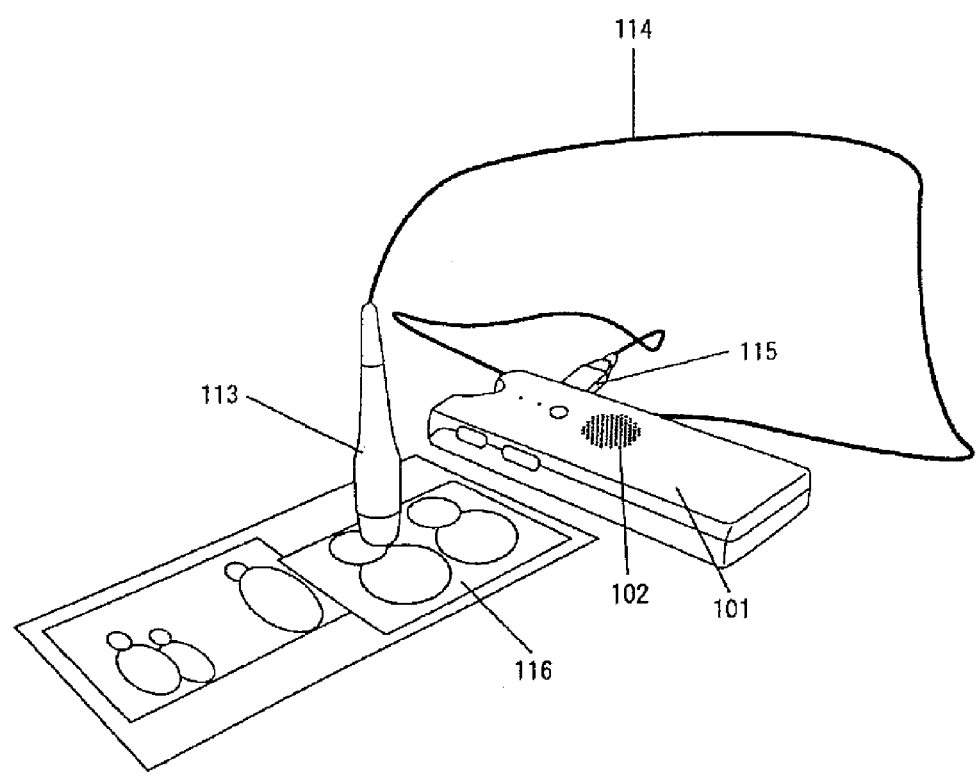
FIG. 4 is an illustrative view of a use state of a voice recorder.

Connector terminal (SCANNER) 110, voice output terminal (PHONE) 111, and external power terminal (DC IN) 112, are provided on the left side face of voice recorder 101. Connector terminal 110 is a universal serial interface such as a USB terminal, for example, so that USB connector 115 provided at an end of cable 114 of scanner 113 (optical reading means) is mounted as shown in FIG. 4.

Figure 5:
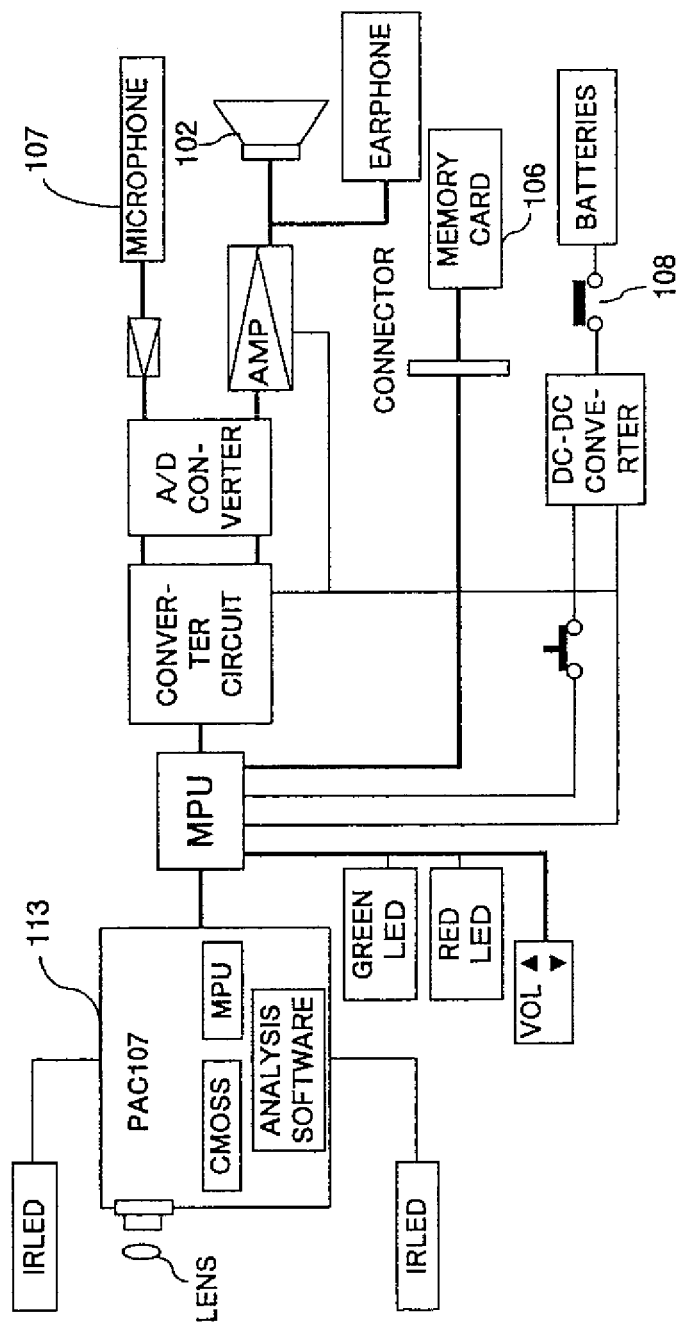
FIG. 5 is a block diagram depicting an internal construction of a voice recorder.

A CMOS image pickup element (CMOSS) is laid out on scanner 113, as shown in FIG. 5. Irradiation light from an LED (IRLED) is irradiated to a print face of a dot pattern and the reflection light is received as wavelength light in only an infrared area via a visible light filter (not shown). The received light is acquired by means of the CMOS image pickup element via a lens, and then, the picked up image is analyzed by means of a central processing unit (MPU). Code information (32-bit dot code) or coordinate information on the analysis result is transmitted to voice recorder 101. At this time, key dot 2 (refer to FIG. 12 and FIG. 14) is laid out in a dot pattern, and an orientation (angle) of a block configuring a dot pattern can also be received as angle information.

Namely, the XY coordinate value of each dot can be identified by expanding an acquired image of a dot pattern to a vide memory, so that, based on the value, an orientation of the dot pattern (angle of dot pattern relative to positive XY coordinate axis of video memory) can be detected by making a search for a grid dot and a key dot.

In the scanner, analysis software is stored in a storing medium such as ROM, and the central processing unit (MPU) executes a process for analyzing the acquired image (dot pattern recognition->numeric value conversion->dot coding->conversion to coordinate information or angle information) by reading the software from the ROM.

As shown in FIG. 5, a central processing unit (MPU) is primarily configured in the main body of voice recorder 101. In other words, under the control of the central processing unit (MPU), voice information inputted from a microphone is processed by means of an AD converter and a compressor circuit via an amplifier, and then, digital voice information is recorded in memory card 106 (storing means) via a connector.

Figure 11:
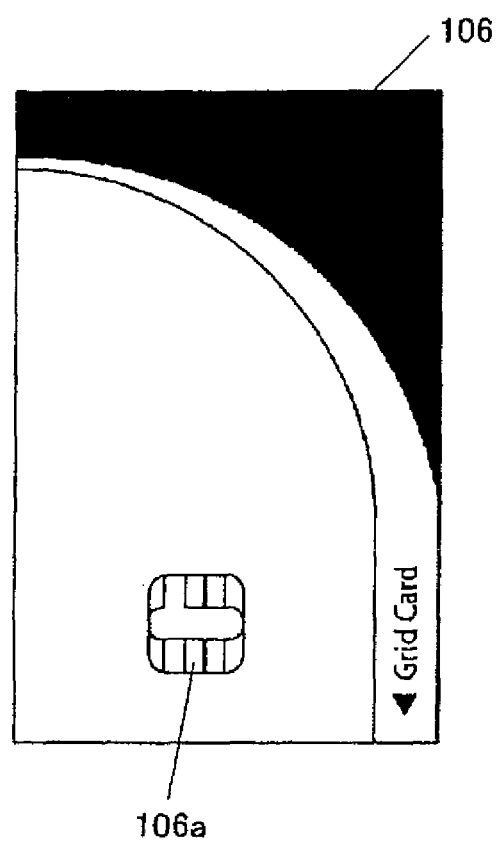
FIG. 11 is a view showing a memory card.

FIG. 11 shows an external view of this memory card 106. This memory card is a plastic card of credit card size incorporating an IC chip as a memory, for example, and has a contact type electrode 106a that configures a signal pin and a power pin. This memory card may be a non-contact radio communication type RFID card. In addition to such a card, the memory card may be a standard type memory card such as an SD card (registered trademark), a mini-SD card (registered trademark), a memory stick (registered trademark), or a memory card duo (registered trademark).

In the voice recorder 101, at the time of playing back voice information, digital voice information read out from memory card 106 (storing means) is read in a central processing unit (MPU) via a connector and the read information is decompressed (expanded) by means of a compressor circuit. The recompressed information is converted to analog information by means of an A/D converter, and then, the converted information is outputted from a speaker via an amplifier (AMP).

A drive current of voice recorder 101 is designed so that the drive current is supplied from batteries to the central processing unit (MPU), the compressor circuit, and the amplifier (AMP) via a DC/DC converter.

Figure 6:
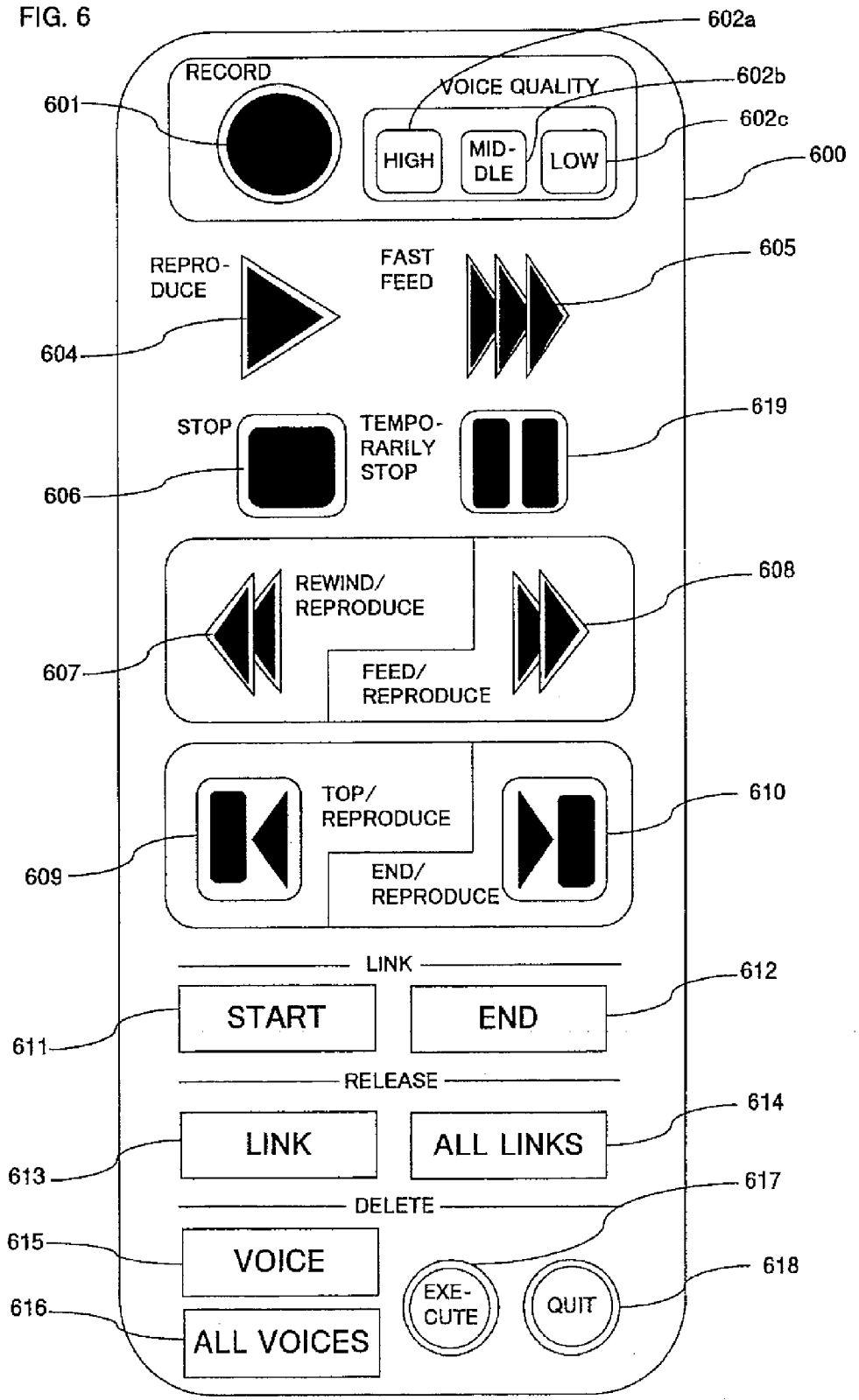
FIG. 6 is a view showing a state in which symbols of an instruction board are laid out.

FIG. 6 shows an instruction board 600 (paper controller: printing medium) for carrying out an operational instruction of voice recorder 101 by reading of scanner 112. On this instruction board 600, symbols indicating operational instructions of voice recorder 101 are printed. On an area of these symbols, a dot pattern denoting a code corresponding to an operational instruction is printed. A description of a dot pattern will be given later.

This instruction board 600 is comprised of paper, a dot pattern is printed on a face surface, and further, laminate processing is applied onto a top layer thereof.

On the instruction board 600, there are provided: record software key 601; voice quality software keys 602a to 602c; reproduction software key 604; fast feed software key 605; stop software key 606; temporarily stop software key 619; rewind/reproduce software key 607; feed/reproduce software key 608; top/reproduce software key 609; and end/reproduce software key 610, so that their respective functions can be instructed from voice recorder 101.

A link-associated instructive symbols are printed at the lower part of instruction board 600. In other words, instructive symbols such as link start software key 611, link end software key 612, link release software key 613, and all-link release software key 614, are laid out.

Further, instructive symbols such as voice delete software key 615 and all-voice delete software key 616 and instructive symbols such as execute software key 617 and quit software key 618 are laid out at the bottom of instruction board 600.

Although not shown, a voice navigation symbol may be printed on instruction board 600. This voice navigation symbol is intended to instructively input the presence or absence of voice guidance at the time of operating instruction board 600.

Figure 7:
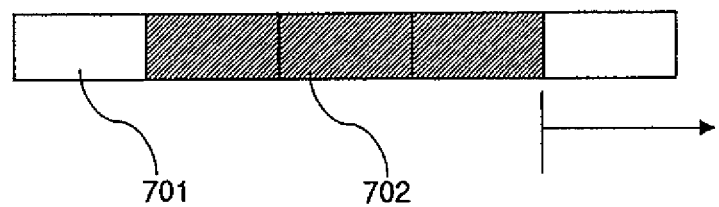
FIG. 7 is a view showing a voice file format.

FIG. 7 shows a format of voice information recorded in storing means (memory card). Voice information is comprised of index 701 and a plurality of voice file tracks 702.

Management information by tracks and reproduction flags is registered in index 701.

In addition, information for disabling deleting/updating of voice information on each voice file track 702 is recorded in index 701, thereby making it possible to separately manage two types of tracks enabling and disabling erasing/updating.

For example, tracks disabling deleting/updating can include tracks having stored therein navigation voice files for vocally instructing next operation of voice recorder 101 or instruction board 600 and tracks on which a voice of actor or actress are recorded in advance in accordance with story of a picture book by means of memory card 106 for sale together with the picture book or the like. On the other hand, words or the like announced by a user who has purchased the card as a character of a picture book can be inputted in tracks enabling deleting/updating.

In addition, the voice navigation guidance voice mentioned previously may be registered in tracks disabling deleting/updating.

Figure 8:
FIG. 8 is an illustrative view of a correlation table and a correlation code.

FIG. 8 shows a correlation table and a correlation code provided in storing means (memory card).

As shown in the figure, in the correlation table of the present embodiment, values of C8 to C22 and C31 are set as a correlation range. In the case where a correlation code existing in this range is coincident with that read from a dot pattern, it is judged that the dot pattern is adaptive to the voice recorder, enabling reproduction of voice information.

A correlation table can be arbitrarily changed. For example, the correlation range of the correlation table may be changed by manufactures of the voice recorder, by memory card manufacturers, or by gate types.

Such correlation tables and correlation codes are registered in memory card 106, thereby making it possible to disable recording/reproduction of voice information by means of only a picture book on which a code identical to the correlation code is printed as a dot pattern. In other words, there can be provided a system of enabling voice recording/reproduction only in combination with a picture book for sale together and memory card 106.

At this time, the central processing unit (MPU receives a dot code (correlation code) of a predetermined area from scanner 113 based on a dot pattern read by scanner 113 and enables recording/reproduction of voice information in memory card 106 if this code is coincident with a correlation code of memory card 106 in comparison.

FIG. 10 illustrates a link table. The link table is provided in memory card 106. The link table is comprised of labels indicating registration sequential orders; voice file track numbers; and 32-bit dot codes, as shown in the figure. In the present embodiment, a plurality of dot codes can be associated with one voice file track number. In this manner, even if mediums such as pictures, seals, or picture books on which a number of different dot patterns are printed are read by means of scanner 113, it becomes possible to reproduce the same voice information.

Next, a dot pattern for use in the present embodiment will be described below.

Figure 12:
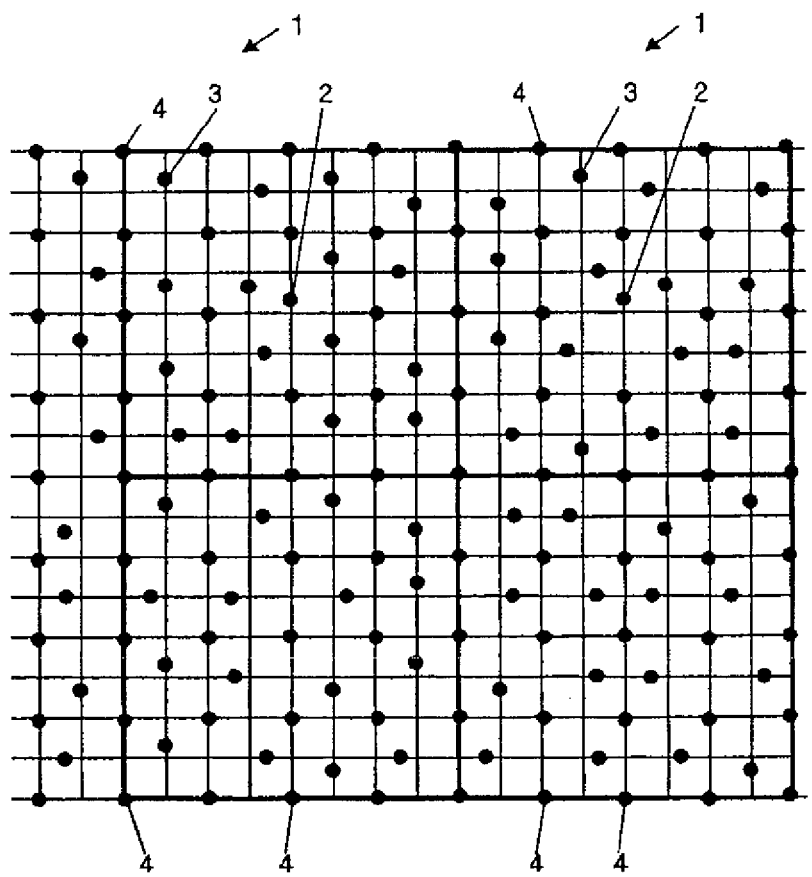
FIG. 12 is a view (1) for explaining a dot pattern.
Figure 13:
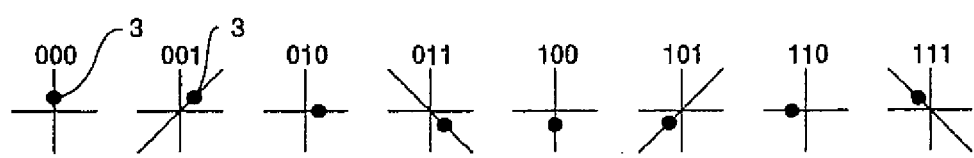
FIG. 13 is a view (2) for explaining a dot pattern.
Figure 14:
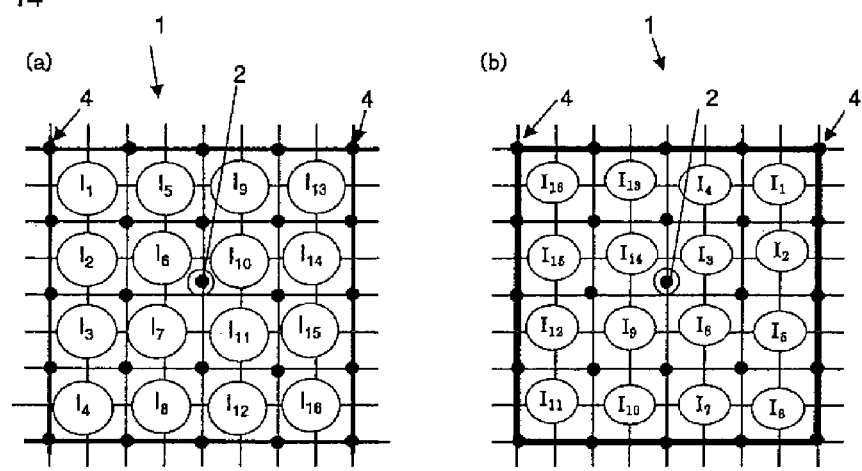
FIG. 14 is a view (3) for explaining a dot pattern.

FIG. 12 is an illustrative view of GRID1 according to one example of a dot pattern of the present invention. FIG. 13 is an enlarged view showing an example of an information dot of a dot pattern and bit representation of data defined thereon. FIG. 14 (a) and FIG. 14 (b) are illustrative views of an information dot when a key dot is primarily laid out.

An information input/output method employing a dot pattern, according to the present invention, is comprised of means for generating dot pattern 1, recognizing the dot pattern 1, and then, outputting information and programs from the dot pattern 1. In other words, dot pattern 1 is picked up as image data by means of a camera; a grid dot is first extracted. Next, it is verified that a dot is not printed at a position at which a grid dot should be essentially present, thereby extracting key dot 2. Next, information dot 3 is extracted, thereby achieving digitization and promoting numeric valuing of information. Voice information is outputted from this dot pattern 1 based on the numeric value information.

In generating dot pattern 1, according to the present invention, fine dots for recognizing information such as voice information, i.e., key dot 2, information dot 3, and grid dot 4 are arranged in accordance with a predetermined rule by means of a dot code generation algorithm. As shown in FIG. 12, in a block of dot pattern 1 that represents information, 5×5 grid dot 4 is laid out around key dot 2, and information dot 3 is laid out around a virtual point of a center surrounded by four grid dots 4. Arbitrary numeric value information is defined in this block. In an illustrative example of FIG. 12, there is shown a state in which four blocks (inside of thick line) of dot pattern 1 are arranged. Of course, dot pattern 1 is not limitative to four blocks.

One item of information can be outputted to one block or one item of corresponding information can be outputted to a plurality of blocks.

When this dot pattern 1 is picked up as image data by means of a camera, grid dot 4 can correct distortion of a lens of that camera or oblique image pickup, expansion and contraction of paper face, curling of a medial surface, and distortion at the time of printing. Specifically, correction function $(Xn, Yn) = f(X'n, Y'n)$ is obtained for converting distorted four grid dots to an original square, an information dot is corrected by means of the same function, and a vector of correct information dot 3 is obtained.

If grid dot 4 is laid out in dot pattern 1, image data obtained by picking up this dot pattern 1 by means of a camera corrects distortion caused by the camera, thus making it possible to precisely recognize the pattern when image data on dot pattern 1 is picked up by means of a popularly spread type camera equipped with a lens with its high distortion rate. In addition, the dot pattern 1 can also be precisely recognized by obliquely reading the camera relative to a face of dot pattern 1.

Key dot 2, as shown in FIG. 12, is laid out by shifting, in a predetermined direction, one grid dot 4 set at a substantially central position of lattice dot 4 that is laid out in a rectangular shape. This key dot 2 is a typical point of dot pattern 1 for one block representing information dot 3. For example, lattice dot 4 at the center of a block of dot pattern 1 is shifted upwardly by 0.1 mm. In the case where information dot 3 represents an X.Y coordinate value, a position at which key dot 2 is shifted downwardly by 0.1 mm is obtained as a coordinate point. However, this numeric value is not limitative thereto and can vary according to whether the block of dot pattern 1 is large or small.

Information dot 3 is a dot for recognizing a variety of information. This information dot 3 is laid out around key dot that serves as a typical point and is laid out at an end point expressed by a vector while the center surrounded by four grid dots 4 is defined as a virtual point, and then, the virtual point is defined as a start point. For example, this information dot 3 is surrounded by lattice dots 4. As shown in FIG. 13, dots distant from the virtual point by 0.1 mm have a direction and a length that are expressed by a vector, so that the dots are rotated by 45 degrees and are laid out in eight directions to express three bits. Therefore, 3 bits×16=48 bits can be expressed in dot pattern 1 of one block.

While, in the illustrative example, three bits are expressed by laying out the dots in eight directions, they can be laid out in 16 directions to express four bits without being limitative thereto, and of course, various modifications can occur.

It is desirable that dot diameters of key dot 2, information dot 3, and grid dot 4 be on the order of 0.05 mm in consideration of precision of printing relative to paper quality, camera resolution, and optimal digitization.

In addition, it is desirable that intervals of grid dot 4 be on the order of 0.5 mm vertically and horizontally in consideration of an amount of information required for an image pickup area and mistaking of a variety of dots 2, 3, and 4. It is desirable that the shifting of key dot 2 be on the order of 20% of grid intervals in consideration of mistaking of grid dot 4 and information dot 3.

It is desirable that intervals between this information dot 3 and a virtual point surrounded by four grid dots 4 be on the order of 15% to 30% of a distance between the adjacent virtual points. A reason of such desirableness is stated below.

If the distance between information dot 3 and the virtual point is longer than this interval, the dots are likely to be visually recognized as a large block and become eyesore as dot pattern 1. Alternatively, if the distance between information dot 3 and the virtual point is shorter than this interval, it becomes difficult to set around which of the virtual points to obtain information dot 3 having vector orientation.

For example, with respect to information dot 3, as shown in FIG. 14 (a), grid intervals for laying out $I_1$ to $I_{16}$ clockwise around key dot 2 are 0.5 mm, and 3 bits×16=48 bits are expressed in 4 mm×4 mm, In a block, a sub-block that has individually independent information contents and that is not affected by another item of information contents can be further provided. FIG. 14 (b) illustrates this sub-block, wherein with respect to a sub-block comprised of four information dots $[I_1, I_2, I_3, I_4]$, $[I_5, I_6, I_7, I_8]$, $[I_9, I_{10}, I_{11}, I_{12}]$, $[I_{13}, I_{14}, I_{15}, I_{16}]$, independent data (three bits×4=12 bits) is expanded to the information dots. The sub-block is thus provided, thereby making it possible to easily carry out an error check in units of sub-blocks.

It is desirable that the vector direction (rotational direction) of information dot 3 be uniformly defined by 30 degrees to 90 degrees.

Figure 15:
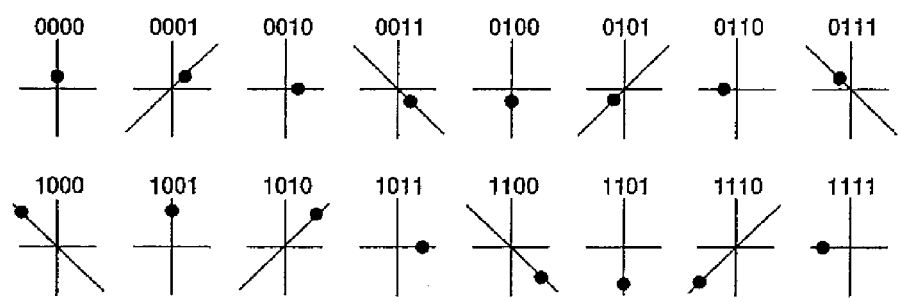
FIG. 15 is a view (4) for explaining a dot pattern.

FIG. 15 shows an example and another embodiment of information dots and bit representation of data defined therein.

In addition, if the vector direction is defined in an eight direction with the use of two types of long and short information dots 3 from a virtual point surrounded by grid dots 4, four bits can be expressed. At this time, it is desirable that the long dot be on the order of 25% to 30% of a distance between the adjacent virtual points and the short dot be on the order of 15% to 20%. However, it is desirable that a central gap between the long and short information dots be longer than the diameters of these dots.

It is desirable that information dot 3 surrounded by four grid dots 4 be one dot in consideration of appearance. However, in the case where an attempt is made to increase an amount of information while ignoring the appearance, one bit is assigned by one vector and information dot 3 is expressed by a plurality of dots, thereby making it possible to provide a large amount of information. For example, in a vector of concentric eight directions, information on $2^8$ can be expressed by information dot surrounded by four grid dots 4 and $2^{128}$ is obtained if 16 information dots of one block exist.

Figures 16, 17:
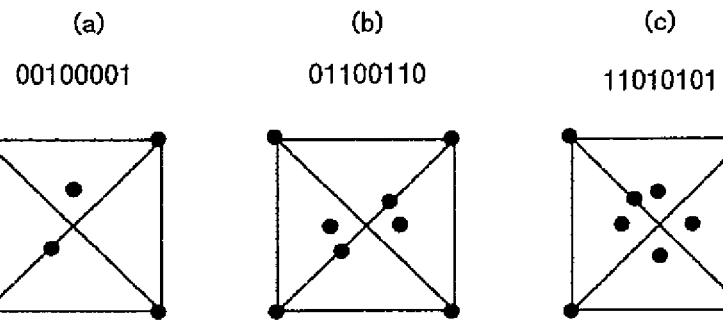
FIG. 16 is a view (5) for explaining a dot pattern.
FIG. 17 is a view (6) for explaining a dot pattern.

FIG. 16 shows an example of information dots and bit representation of data defined therein, wherein FIG. 16 (a) shows that two dots are laid out; FIG. 16 (b) shows that four dots are laid out; and FIG. 16 ((c) shows that 5 dots are laid out.

FIG. 17 shows modification of a dot pattern, wherein FIG. 17 (a) is a schematic view showing that six information dots are laid out; FIG. 17 (b) is a schematic view showing that nine information dots are laid out; FIG. 17 (c) is a schematic view showing that 12 information dots are laid out; and FIG. 16 (d) is a schematic view showing that 36 information dots are laid out.

Dot pattern 1 shown in FIG. 12 and FIG. 14 shows an example in which 16 (4×4) information dots are laid out in one block. However, the number of the information dots 3 can be variously modified without being limitative thereto. For example, 6 (2×3) information dots 3 may be laid out in one block in FIGS. 12 and 14 (a); 9 (3×3) information dots 3 may be laid out in one block in FIGS. 12 and 14 (b); 12 (3×4) information dots 3 may be laid out in one block in FIGS. 12 and 14 (c); or 36 (6×6) information dots 3 may be laid out in one block in FIGS. 12 and 14 (d).

Such dot patterns are printed on a surface of as photograph 116 (refer to FIG. 4) or a material such as a picture book or card. In addition, they are also provided at symbol portions of instruction board 600 (paper controller) described in FIG. 6.

Next, operating procedures employing voice recorder 101 of the present embodiment will be described below.
(Basic Function)

A picture book on which dot patterns are printed to be superimposed on patterns and recorded memory card 106 are commercially available together. A user who has purchased them wears memory card 106 on voice recorder 101. Then, as shown in FIG. 4, the user wears connector 115 of scanner 113 on connector terminal 110. When scanner 113 reads dot patterns printed on a picture of a dog, for example, of the picture book, in a superimposed manner, a central processing unit (MPU) of the scanner analyzes the dot patterns by means of analysis software, and then, converts them to dot codes (code information). These dot codes are transmitted to a central processing unit (MPU) of voice recorder 101. Voice recorder 101 makes a search for a link table (refer to FIG. 10) of memory card 106 based on the dot codes. Then, the voice recorder reads out corresponding voice file track 702 (for example, bark) in memory card 106. Voice information on this voice file track 702 is decompressed (expanded) by means of a compressor circuit; the compressed information is converted to analog voice information by means of an AD converter; and then, the converted information is outputted from a speaker via an amplifier (AMP). When a portion of a picture of a dot on a picture book is read by means of scanner 113, a bark is reproduced from speaker 102 of voice recorder 101.

(Playback Procedures)

Next, a detailed description will be given with respect to a variety of reproducing methods in a case in which voice information is associated with a dot pattern in advance in memory card 106.

First, when a material such as a picture book, a photograph, or a seal on which dot patterns are printed is clocked (picked up as an image) by means of a scanner, dot codes corresponding to dot patterns are analyzed as described previously, reference is made to a link table, and then, voice information corresponding to the dot codes is reproduced. At this time, a central processing unit (MPU) plays back voice information and illuminates an LED of a recording/reproduction display portion.

Next, during voice reproduction, if a symbol of fast feed software key 605 of instruction board 600 is clocked (picked up as an image), fast feed reproduction (x-times playback: x is an arbitrary integer) is executed.

In the case where an attempt is made to reset a reproduction speed (to reset a current speed to normal voice reproduction), the user clicks again a symbol of fast feed software key 605 of instruction board 600 or clicks a symbol of reproduction software key 604.

In addition, during voice reproduction, if a symbol of temporarily stop software key 619 of instruction board 600 is clicked by means of scanner 113; reproduction is temporarily stopped (paused). A symbol of temporarily stop software key 619 is clicked again, whereby reproduction is restarted.

Further, during voice reproduction, if a feed/reproduction software key 608 is clocked, the central processing unit (MPU) makes a search for a link table (refer to FIG. 10) in memory card 106, and then, starts reproduction of voice file track 702 registered in a next label (in sequential order of registration) of voice file track 702 being currently reproduced. In addition, rewind/reproduce software key 607 is clicked, the central processing unit (MPU) makes a search for a link table (refer to FIG. 10), and then, starts reproduction of voice file track recorded in a preceding label (in sequential order of registration) of voice file track 702 being currently reproduced.

Furthermore, during voice reproduction, if end/reproduce software key 610 is clicked, the central processing unit (MPU) makes a search for a link table (refer to FIG. 10) in memory card 106, and then, starts reproduction of the last track (voice file track No. 4 in FIG. 10) of voice file track 702. Further, if top/reproduction software key 609 is clicked, reproduction of a first track of voice file track 702 (voice file track No. 3 in FIG. 10) is started.

(Recording Procedures)

In the case where a voice is newly recorded in voice recorder 101, recording is started by clicking a symbol of record software key 601 of instruction board 600 by means of scanner 113 or by pressing a record/reproduce button of the main body. The voice generated toward microphone 107 is digitally converted by means of an A/D converter, and the digitally converted voice is compressed by means of a compressor circuit. Voice information is registered sequentially in memory card 106 in such a compressed data format.

During this recording, recording is stopped by clicking a symbol of record software key 601 or a symbol of temporarily stop software key 606 on instruction board 600 by means of scanner 113 or by pressing a record/reproduce button of the main body. The voice information that has been recorded up to now is recorded in memory card 106.

In the case where these voices are deleted, in a state in which a voice is reproduced from speaker 102 or if a symbol of voice delete software key 615 of instruction board 600 is clicked by means of scanner 113 within five seconds after reproduction of voice, a buzzer is outputted from speaker 102, and the LED of recording/reproduction display portion 106 blinks for five seconds. If a symbol of execute software key 617 of instruction board 600 is clicked, a reproduced voice is deleted. At this time, the central processing unit (MPU) carries out a processing operation of deleting data on the voice file track 702 from memory card 106.

In addition, this voice delete mode is terminated in the case where a symbol of quit software key 618 is clicked by means of scanner 113 for the five seconds or in the case where any symbol is not clicked for the 5 seconds.

Further, in the case where an attempt is made to delete all of the voice information recorded in memory card 106, a symbol of all-voice delete software key 616 may be clicked by means of scanner 113 instead of the voice delete software key 615.

(Link Work)

In the present embodiment, a user can freely set which dot pattern to associate voice information recorded by oneself or existing voice information stored in memory card 106. This setting is referred to as link setting.

Link setting is managed by means of a link table shown in FIG. 10 (by setting in memory card 106).

At the time of creating a link, first, voice recording is started by clicking a symbol of record software key 601 of instruction board 600 or by pressing a record/stop button 103. At this time, an LED of recording/reproduction display portion 104 blinks.

Next, while a recording state is maintained, if a dot pattern printed on a material such as a picture book, a photograph, a seal, or a card is clicked (picked up as an image) by means of scanner 113, a central processing unit (MPU) stops the recording state and associates and registers a dot code of the dot pattern picked up as an image relative to a recorded voice file track number. At this time, a buzzer is outputted from speaker 102, thereby notifying to a user that a link is generated.

In addition, when a dot pattern is clicked by means of scanner 113, in the case where another voice file track 702 has already been associated with, and registered in, the dot code corresponding to the dot pattern in a link table, the central processing unit MPU) generates a buzzer from speaker 102, and then, notifies to a user that a link cannot be created.

Next, a description will be given with respect to procedures for generating a link with a dot pattern in the case where voice information has already been registered in memory card 106.

First, if a symbol of link start software key 611 of instruction board 600 is clicked by means of scanner 113, a central processing unit (MPU) of voice recorder 101 blinks an LED of link display portion 105, and then, notified to a user that a link is started.

Next, a symbol of reproduction software key 604 of instruction board 600 is clicked by means of scanner 113 to reproduce a voice of voice file track 702 to be linked. At this time, a user switches voice file tracks 702 to be reproduced, by clicking feed/reproduce software key 608, rewind/reproduce software key 607, top/reproduce software key 609, and end/playback software key 610, and makes a search for desired voice file track 702.

While desired voice file track 702 is thus reproduced, or alternatively, if a dot pattern printed on a material such as a picture book, a photograph, a seal, or a card is clicked by means of scanner 113, the voice file track 702 and a dot code of the dot pattern are associated with each other, and then, are registered in a link table. In the case where another voice file track 702 is associated with, and is registered in, the dot code corresponding to the dot pattern in the link table, a central processing unit (MPU) generates a buzzer from speaker 102, and then, notifies to a user that a link cannot be created.

As described above, one dot pattern (dot code) can be linked with only one voice file track, whereas one voice file track 702 can be linked with a plurality of dot patterns (dot codes). Therefore, even if dot patterns are completely different from each other, it becomes possible to reproduce the same voice information by clicking them.

In the case where the above link mode is terminated, a symbol of a link end software key 612 of instruction board 600 is clicked by means of scanner 113. In this manner, voice recorder 101 reverts to an initial state when power switch 108 is turned ON.

Next, a description will be given with respect to procedures for deleting a link of a link table set as described above.

In the case where an attempt is made to delete any link, first, a dot pattern in which a link has already been generated in a link table is clicked by means of scanner 113, and a central processing unit (MPU) reads out and plays back an associated voice file track.

Next, during the voice reproduction or within five seconds after the completion of reproduction, a symbol of link release software key 613 is clicked by means of scanner 113. Next, a central processing unit (PMU) generates a buzzer from speaker 105 for five seconds and blinks an LED of link display portion 105. If a symbol of execute software key 617 of instruction board 600 is clicked by means of scanner 113 in this duration, a link between the dot pattern (dot code) and a voice file track is released. At this time, a voice file track associated by releasing a link is not deleted.

In addition, in the case where a symbol of quit software key 618 is clicked by means of scanner 113 within the five seconds or in the case where any symbol is not clicked within the five seconds, this mode is terminated.

Next, in the case where all links in a link table are released, a symbol of all-link release software key 614 may be clicked by means of scanner 113 instead of a symbol of the link release software key 613. The procedures are identical to those for releasing individual links described previously. A description thereof is omitted here.

(Other Functions)

In addition to the functions described above, voice recorder 101 has additional functions described below.

In the case where any switch or button is not operated for five seconds and any dot pattern or symbol is not clicked by means of scanner 113, power is turned OFF. This is achieved by a central processing unit (MPU) using a clock to carry out counting for five minutes and carrying out control of opening a switch existing between the central processing unit (MPU) and a DC-DC converter.

Voice recorder 101 can vary voice quality (bit rate relative to a voice to be recorded. In the case where a symbol of "low" software key 602c of voice quantity is clicked by means of scanner 113, a bit rate to be recorded is lowly set, enabling recording for a long period of time. On the other hand, a symbol of "high" software key 602a is clicked, a bit rate is highly set, enabling high definition recording. A symbol of "middle" software key 602b can be set at a middle bit rate between the "high" and "low" bit rates.

A central processing unit (MPU) monitors a free space of memory card 106. When the free space is less than 0.2 Mbytes, an LED of recording/reproduction display portion 104 is blinked to notify to a user the fact that a small amount of recordable time remains. At this time, as described previously, in the case where a symbol of voice navigation is clicked on instruction board 600 by means of scanner 113, notification to a user such as voice information "small memory space remains", for example, may be outputted from speaker 102.

While the embodiment has described only a case of code information (dot code) that serves as a dot pattern formed on a material such as a photograph, a picture book, a card, or a seal, coordinate information, a combination of code information and coordinate information, and a combination of angle information by key dot 2 may be read by means of a scanner.

In the case where angle information is combined, for example, it becomes possible to output voice information different depending on an orientation (angle) of a card on which a dot pattern to be read is printed relative to scanner 113.

Figure 18:
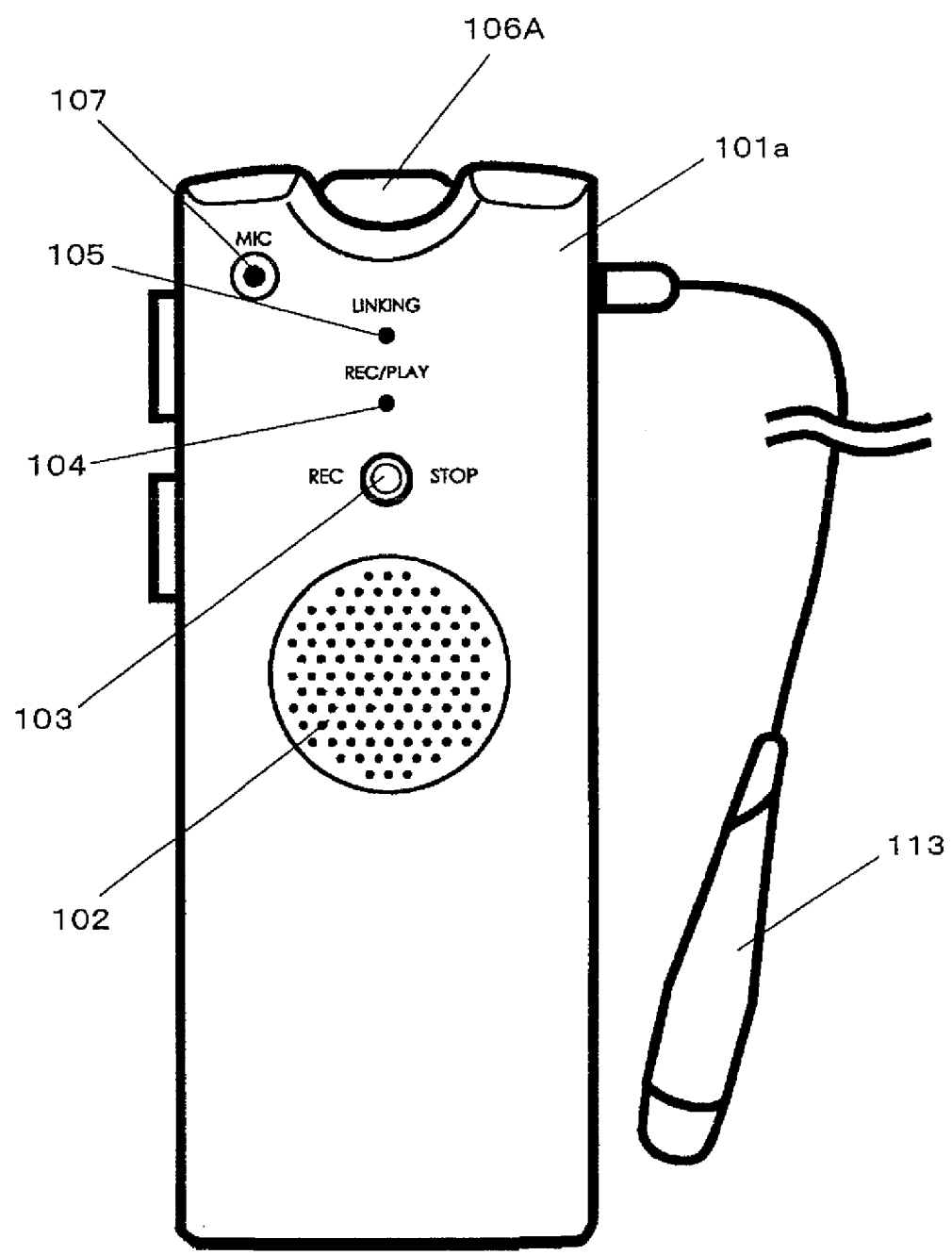
FIG. 18 is a view for explaining a state in which an SD card is used as a memory card.
Figure 19:
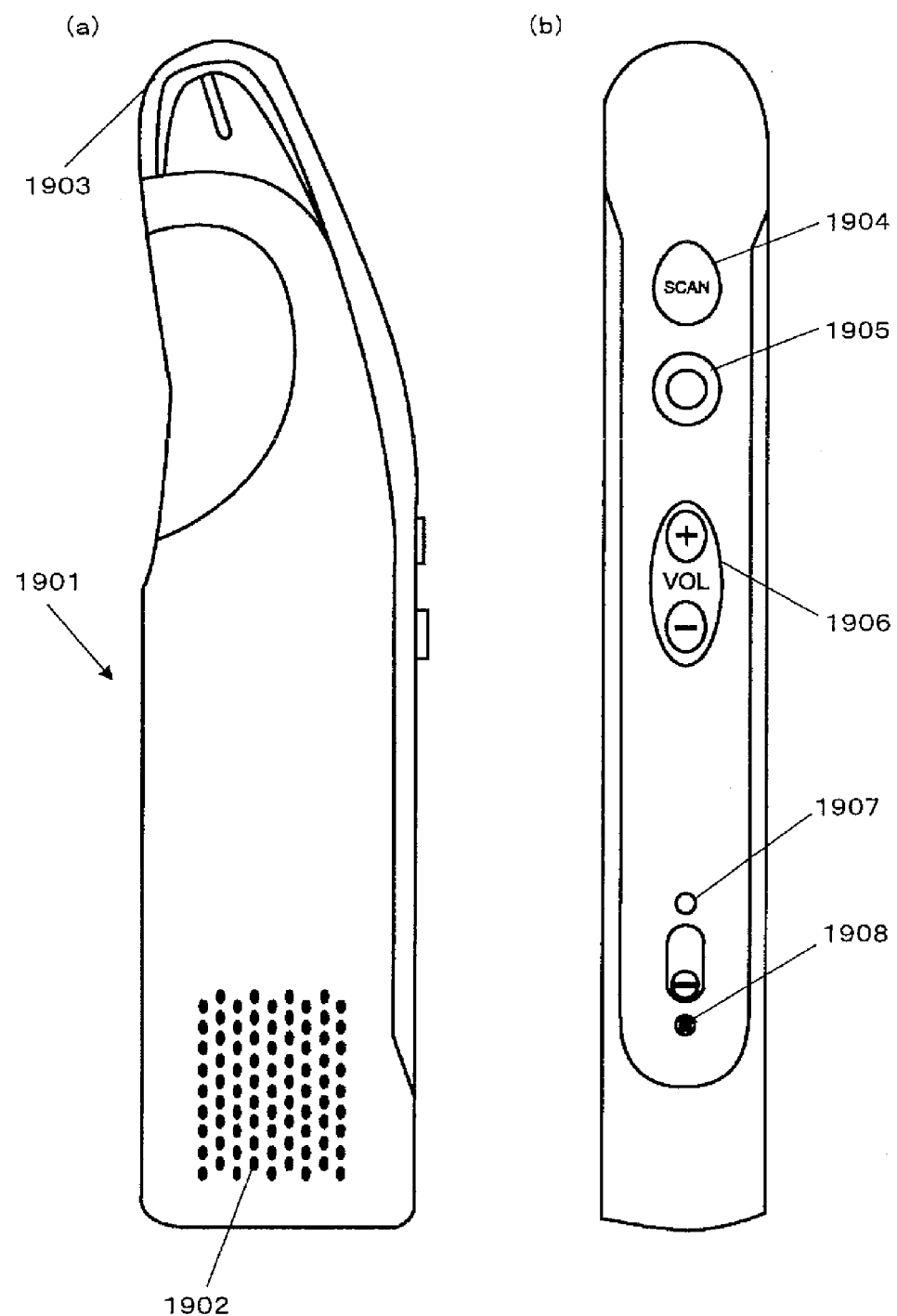
FIG. 19 is a view for explaining another embodiment of a voice recorder.

FIG. 18 and FIG. 19 show other embodiments of the present invention.

While voice recorder 101a shown in FIG. 18 is substantially identical to voice recorder 101 shown in FIG. 1, SD card 106A is employed as a memory card. Other functions are identical to those described in FIG. 1. A description thereof is omitted here. While an SD card was shown in FIG. 18, any memory medium such as a mini-SD, a memory stick, a memory stick duo may be employed.

FIG. 19 shows voice recorder 1901 with which a scanner is integrated.

Sensor unit 1903 is incorporated at a distal end of equipment main body of this voice recorder 1901 (at an upper end in the figure). Although not shown, there is provided infrared-ray irradiation means such as infrared LED or image pickup means comprised of CCD or CMOS for acquiring reflection light from a dot pattern. In other words, scanner 113 described in FIG. 4 and FIG. 5 is structured so that the scanner is incorporated integrally with a main body of voice recorder 1901.

Speaker 1902 is provided on a side face in the vicinity of a bottom part of the main body so that a voice inputted from microphone 1908 or a voice or music and the like registered in advance in SE card 106A (not shown in FIG. 19) or a built-in memory is outputted.

On a front face of this voice recorder 1903 (operating face shown in FIG. 19 (b)), scanner button 1904, record button 1905, volume 1906, LED 1907, and microphone 1908 are arranged, respectively, from the sensor unit side.

<Embodiment Having Rotational Parameter>

FIG. 20 to FIG. 27 show other embodiments of the present invention.

These embodiments are directed to a base (voice information recording apparatus) that is capable of recognizing an angle of a dot pattern (figure orientation), thereby outputting a dot code and a voice corresponding to an angle thereof.

Figure 20:
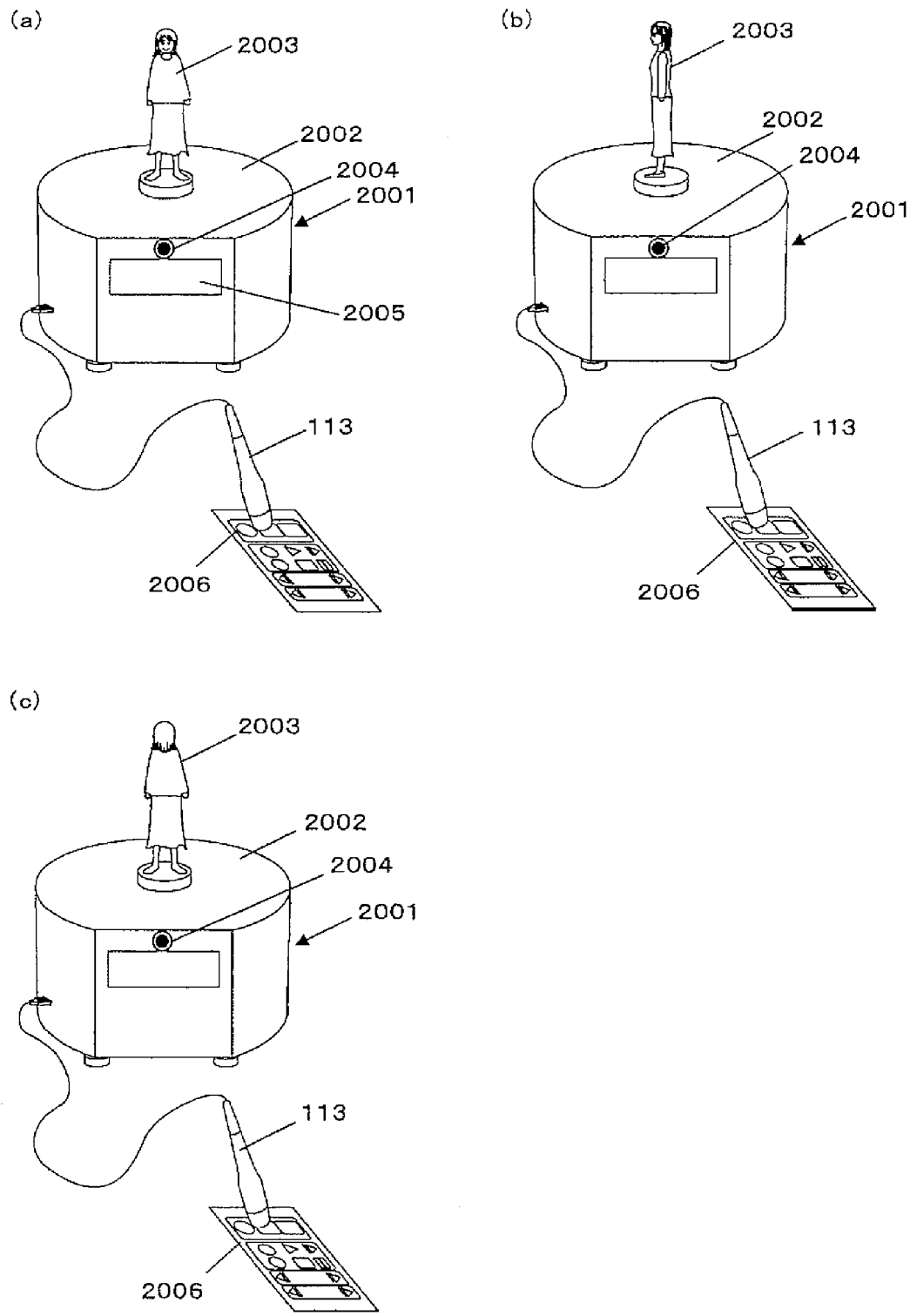
FIG. 20 is a view for explaining a voice recorder having a function of detecting an angle.

The present embodiment, as shown in FIG. 20, is comprised of base 2001; scanner 113 connected to the base; paper controller 2006 to be read by means of the scanner 113; and figure 2003 placed at stage 2002 on a top face of base 2001.

In addition, microphone 2004 and liquid crystal display portion 2005 are provided at the front side of a peripheral face of base 2001.

A seal on which the dot pattern described in FIG. 12 to FIG. 17 is printed is attached onto a bottom face of figure 2003.

Infrared-ray irradiation means, although is not shown, (for example, infrared irradiation LED) and image pickup means (such as CCD or CMOS) are provided inside of base 2001 so that a dot pattern on the bottom face of figure 2003 can be picked up as an image via a reading pore provided at stage 2002 of base 2001.

Figure 21:
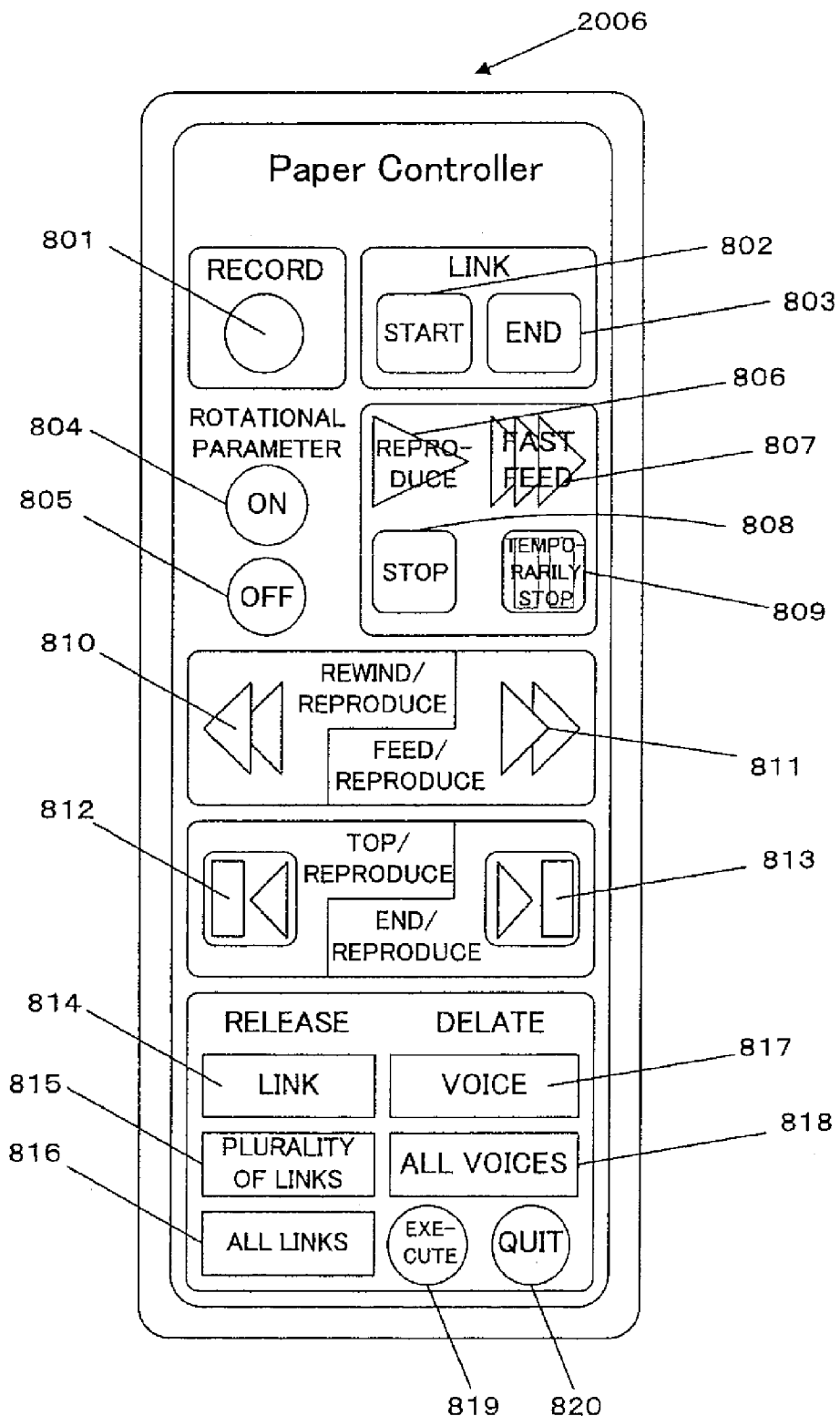
FIG. 21 is a view showing a state in which symbols of an instruction board are laid out.

An instruction board (paper controller 2006) for use in the present embodiment is shown in FIG. 21.

On this paper controller 2006, there are provided: a record area for specifying recording; a link area; a rotational parameter area; a reproduction control area for carrying out reproduction control of reproduction, fast feed, rewind/reproduction, feed/reproduction, top/reproduction, and end/reproduction; and a link control area for controlling link generation or releasing and voice deleting, and dot patterns are printed, respectively.

In other words, these areas of paper controller 2006 are picked up as images by means of scanner 113, whereby voice input, reproduction, and association (link) with a figure can be controlled.

Further, an ON/OFF area of a rotational parameter is provided in paper controller 2006.

This rotational parameter ON/OFF area is intended to instruct whether a parameter for an orientation of a dot pattern provided on a bottom face of a figure is established at an ON state (a mode for carrying out control while an orientation parameter is added) or at an OFF state (a mode for carrying out control while an orientation parameter is ignored). When an ON area is picked up as an image by means of scanner 113, figure 2003 on stage 2002 is placed with its orientation being frontal (FIG. 20 (*a*)), when the figure is placed on its sideway (FIG. 20 (*b*)), and when the figure is placed with its backside being toward a frontal face (FIG. 20 (*c*)), it becomes possible to output a voice that is different depending on a respective one thereof.

Figures 25, 26:
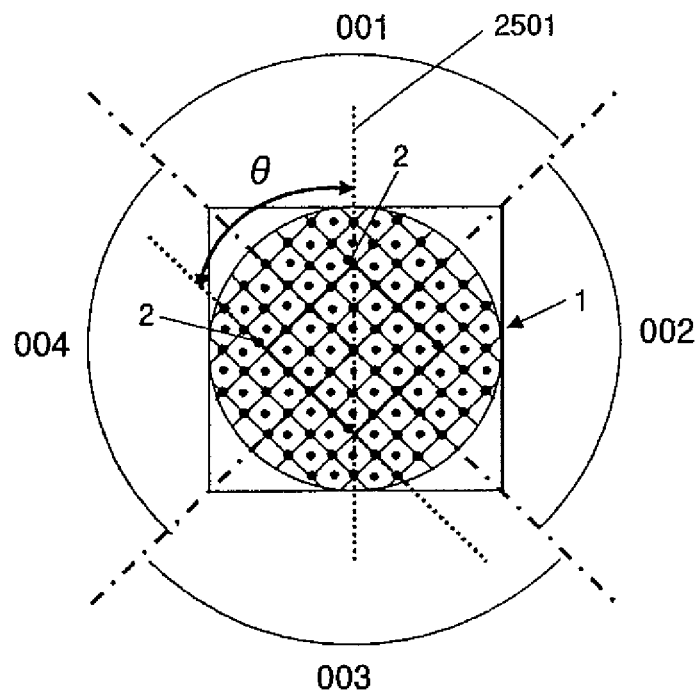
FIG. 25 is a view (1) for explaining a method for detecting an angle.
FIG. 26 is a view for explaining a voice determination table.

FIG. 25 is a view illustrating a technique for detecting an orientation of a dot pattern.

As described in FIG. 12, dot pattern 1 is configured so that information dots 3 are laid out around key dot 2. Therefore, in an algorithm for extracting a valid value of an information dot from dot pattern 1 (analysis program executed by means of a central processing unit), image data on dot pattern 1 picked up as an image by means of scanner 113 or sensor unit 1903 is expanded in a video memory, pixels of this video memory are analyzed, and a search is first made for key dot 2. Therefore, if a search is made for key dot 2, a gradient of dot pattern 1 relative to an orientation of dot pattern 1 (image pickup reference line 2501 (positive Y direction)) can be calculated.

In the present embodiment, an angle of this orientation serving as a parameter is added to a valid code value of a dot pattern. Even if the same dot pattern is generated, voice data (voice address) outputted by an angle can be changed.

While a description was given by way of an angle associated with an orientation of a dot pattern relative to a positive Y direction, of course, a positive X direction may be defined as a reference.

FIG. 26 shows a voice determination table in the case where an angle thereof is added as a parameter. This table will be described in association with an orientation of figure 2003 described in FIG. 20. When figure 2003 is placed with its orientation being frontal (FIG. 20 (*a*)), an angle ranges from −46 degrees to +45 (0±45) degrees. Thus, angle No. 0901 is selected by means of a voice determination table, and then, a voice "good morning" recorded in voice address "a" is generated from a speaker (not shown) of base 2001.

In addition, as shown in FIG. 20 (*b*), in the case where figure 2003 is placed with its orientation being toward the left direction, an angle ranges from +46 degrees to +135 (90±45) degrees. Thus, angle No. 0002 is selected by means of the voice determination table, and a voice "good afternoon" recorded in voice address "b" is generated from a speaker (not shown) of base 2001.

Further, as shown in FIG. 20 (*c*), in the case where figure 2003 is placed with its back being toward a frontal face, an angle ranges from +136 degrees to +225 (180±45) degrees, so that angle No. 0002 is selected by means of the voice determination table, and then, a voice "good evening" registered in voice address "c" is generated from a speaker (not shown) of base 2001.

<Recording and Link Processing>

Figure 22:
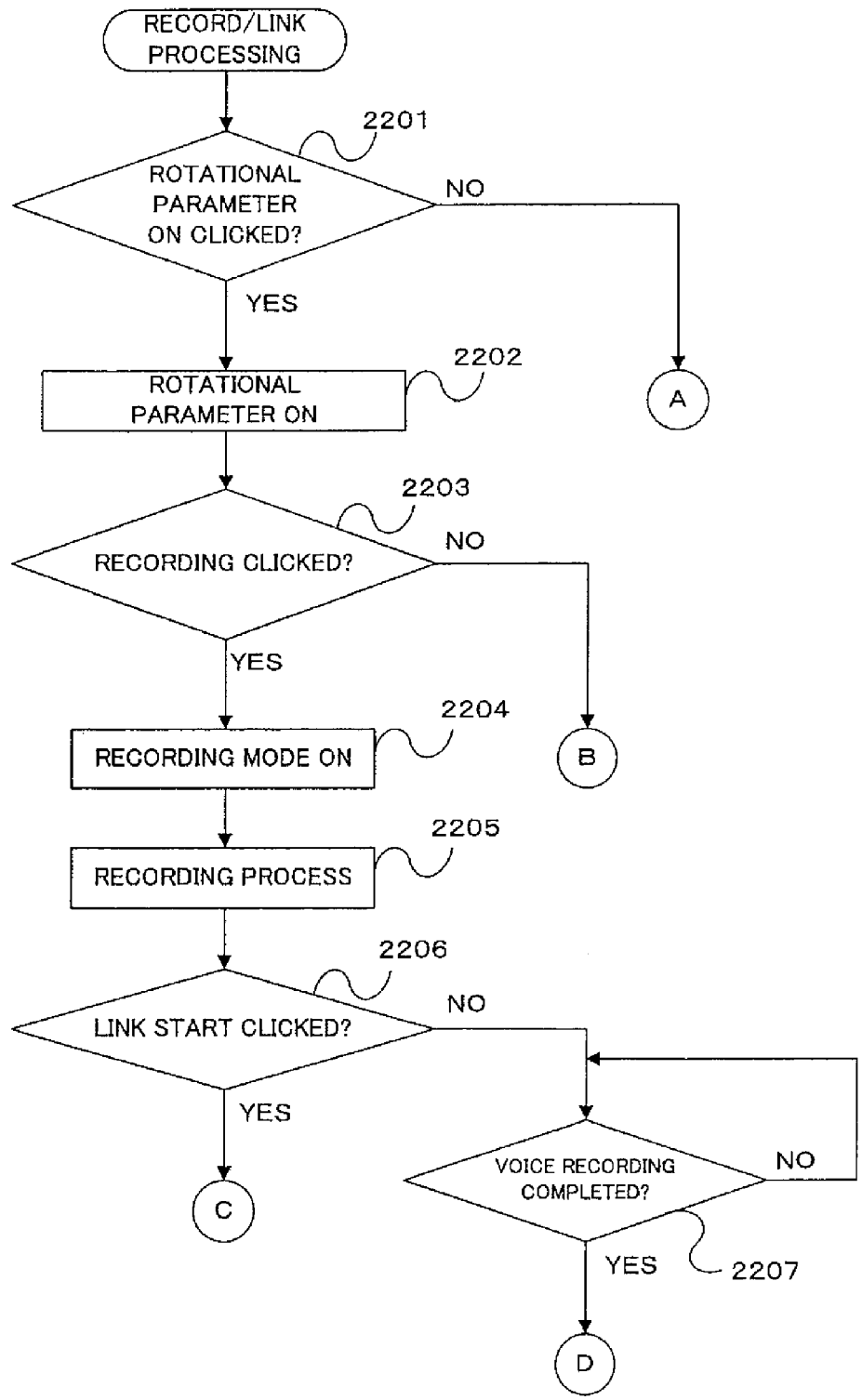
FIG. 22 is a flow chart (1) showing a recording/link processing operation.
Figure 23:
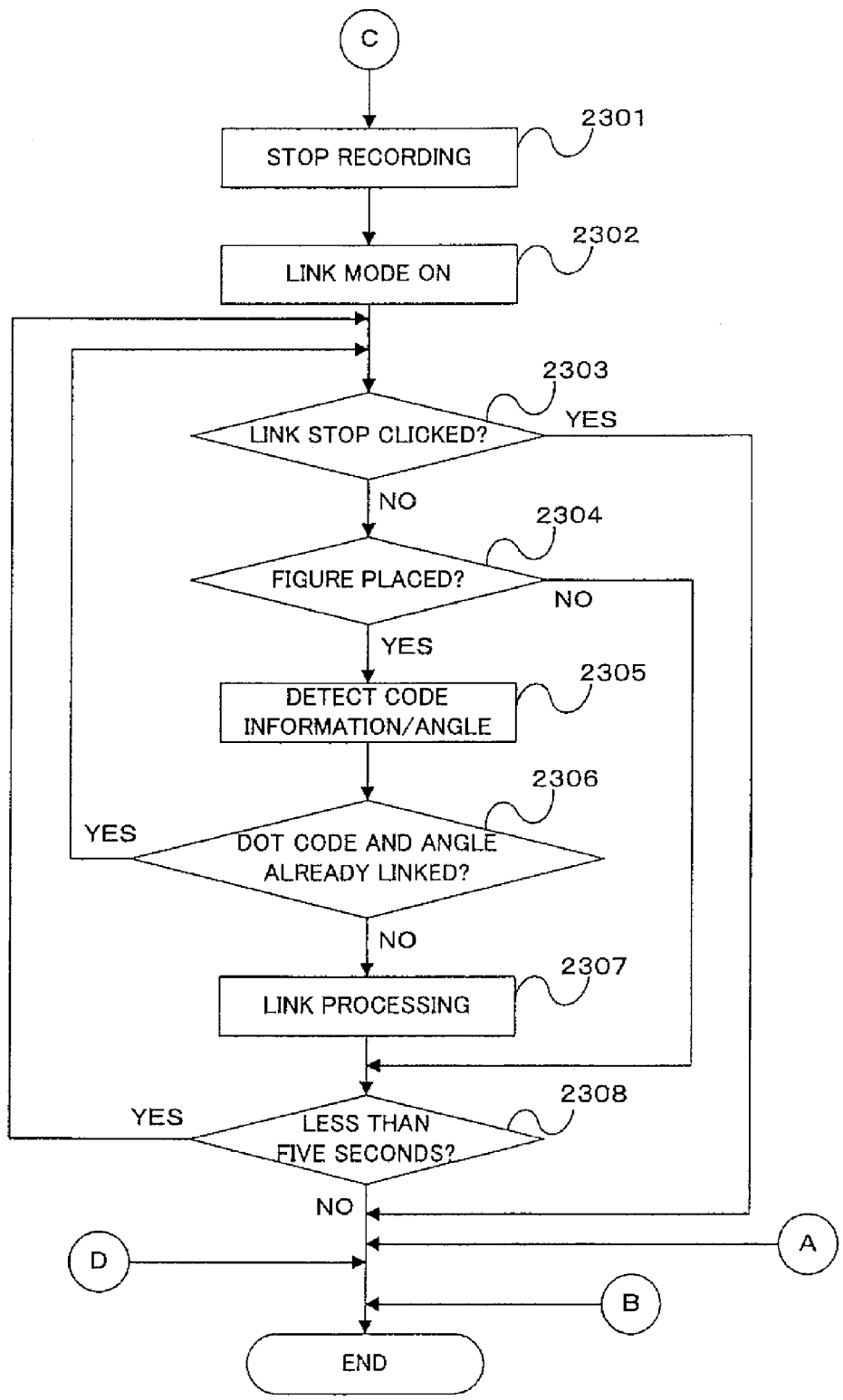
FIG. 23 is a flow chart (2) showing a recording/link processing operation.
Figure 24:
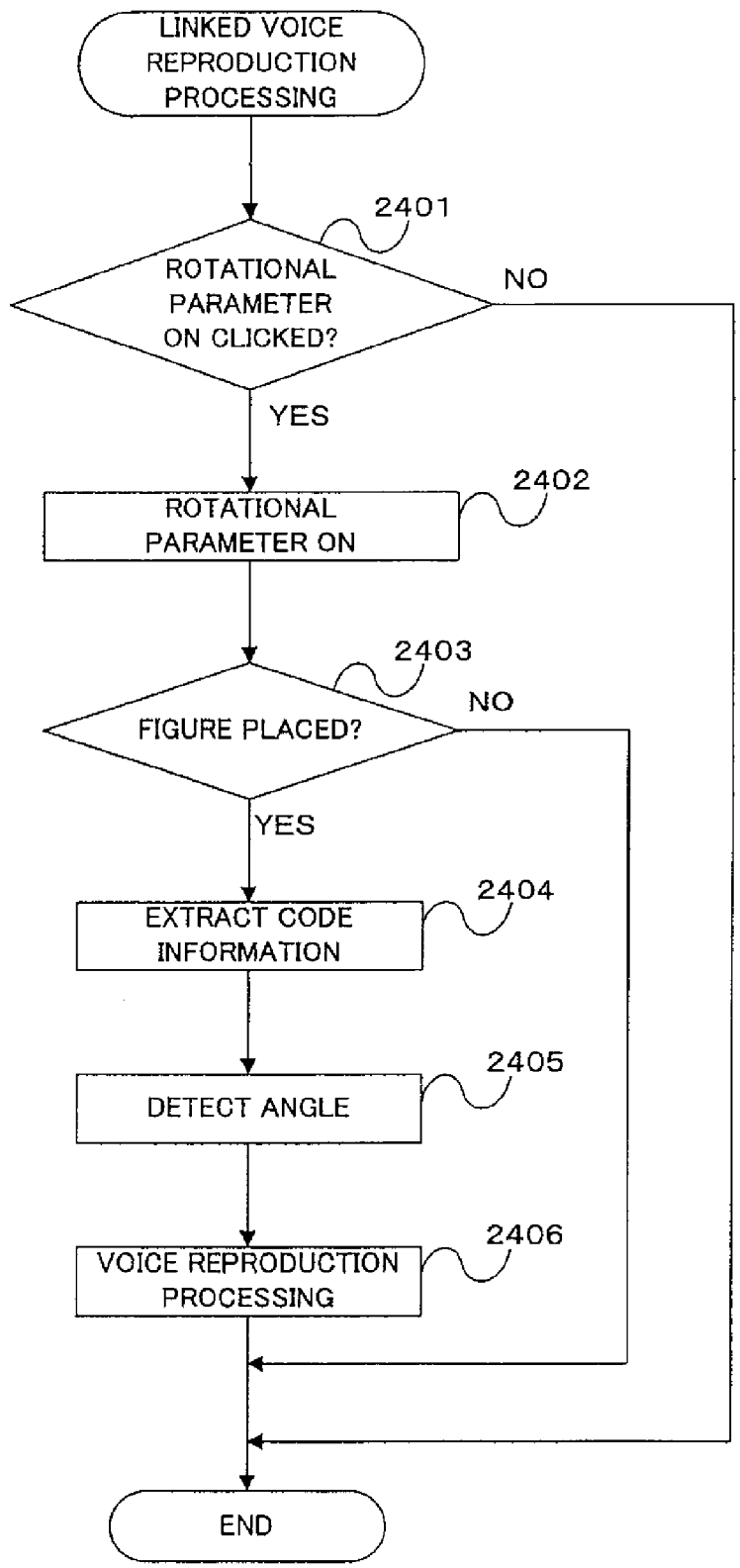
FIG. 24 is a flow chart showing a processing operation of playing back a linked voice.

Next, with reference to FIG. 22 to FIG. 24, procedures for operating a voice recorder of the present embodiment will be described below.

First, a central processing unit (MPU) of a scanner judges whether or not a symbol of rotation parameter ON key 804 has been clicked by a user based on a program (2201). In the case where the judgment result is positive, processing moves to step 2202. In the case where the judgment result is negative, this processing is terminated.

In step 2202, a rotational parameter is turned ON. The central processing unit (MPU) of the scanner analyzes a dot pattern read in step S2201 by means of analysis software, and then, converts the pattern to a dot code (code information). This dot code is transmitted to a central processing unit (MPU) of base 2001. Then, the central processing unit (MPU) of base 2001 turns ON a rotational parameter.

Next, it is judged whether or not record key 801 has been clicked (2203). In the case where the judgment result is affirmative, processing moves to step 2204. In the case where the judgment result is negative, this processing is terminated.

In step 2204, a record mode is turned ON.

Next, a record processing operation is carried out (2203). The central processing unit (MPU) of base 2001 digitally converts a voice generated toward microphone 2004 by means of an A/D converter, and then, compresses the generated voice by means of a compressor circuit. Voice information is sequentially registered in a memory in such a compressed data format.

Next, it is judged whether or not a symbol of link start key 802 has been clicked (step 2206). In the case where judgment result is affirmative, recording is stopped (2301). In the case where the judgment result is negative, processing moves to step 2207.

In step 2207, it is judged whether or not voice recording has completed (2207). In the case where it is judged that a symbol of record key 801 or a symbol of stop key 808 has been clicked, this processing is terminated. In the case where it is not judged that recording has completed, the processing in step 2207 is carried out again.

In step 2301, a recording state is stopped. Then) a link mode is turned ON (2302).

Next, it is judged whether or not a symbol of link end key 803 has been clicked (2303). In the case where the Judgment result is affirmative, this processing is terminated. In the case where the judgment result is negative, processing moves to step 2304.

In step 2304, it is judged that figure 2003 is placed on stage 2003 of base 2001. Judgment is made as to whether or not figure 2003 is placed, based on whether or not a sensor unit of a base can read a dot pattern on the bottom face of figure 2003. In the case where the judgment result is affirmative, the dot pattern read by the sensor is transmitted to a central processing unit (MPU).

In step 2305, extraction of code information and detection of an angle are carried out. The central processing unit (MPU) extracts code information from the read image information by means of an image-processing algorithm. Then, an angle of the dot pattern is calculated from a position of a key dot.

Next, it is judged whether or not a dot code and an angle has already been linked (2306). The central processing apparatus (MPU) of the base judges whether or not another voice file track is associated with the dot code and the angle and is registered in a link table. In the case where the judgment result is affirmative, the processing from step 2303 is carried out again. In the case where the judgment result is negative, processing moves to step 2307.

In step 2307, a link processing operation is carried out. The central processing unit (MPU) registers code information and an angle to be associated with a recorded voice file track number.

Next, the central processing unit (MPU) reads a timer value and then, judges whether a time interval of five seconds has elapsed after or not a symbol of link start key 802 has been clicked. In the case where the judgment result is negative, the processing from step 2303 is carried out again. In the case where the judgment result is affirmative, this processing is terminated.

While, in this processing, recording and linking have been continuously carried out, it is possible to generate a link with voice information that has already been registered in a memory.

<Linked Voice Reproduction Processing>

Next, with reference to FIG. 24, a description will be given with respect to procedures for playing back a voice linked by means of the processing of FIG. 22 and FIG. 23.

First, a central processing unit (MPU) of a scanner judges whether or not a user has clicked a symbol of rotational parameter ON key 804. In the case where the judgment result is affirmative, a rotational parameter is turned ON (2402). In the case where the judgment result is negative, this processing is terminated.

Next, it is judged whether or not a figure has been placed (2403). In the case where the judgment result is affirmative, the dot pattern read by the sensor is transmitted to the central processing unit (MPU). Then, code information is extracted from the read image information (2404), and then, an angle of the dot pattern is calculated from a position of a key dot (2405).

Next, voice reproduction processing is carried out (2406). The central processing unit (MPU) makes a search for a link table in a memory, finds out a voice file track corresponding to both of code information and an angle, and then, reads out the corresponding voice file track in the memory. Voice information on this voice file track 702 is decompressed (expanded) by means of a compressor circuit, the decompressed information is converted to analog voice information by means of an A/D converter, and then, the converted information is outputted from a speaker via an amplifier (AMP).

<Angle Detection Method>

As described previously, FIG. 25 describes an angle of dot pattern 17 wherein an angle (orientation) of a gradient of dot pattern in a planar direction can be detected by detecting the position of key dot 2 described previously. A voice determination table of FIG. 26 is comprised of a character code) an angle, an angle number, and a voice address. When dot pattern 1 is read by means of a sensor, the character code recorded in this dot pattern 1 is first determined. Next, when an angle of dot pattern 1 is calculated with key dot 2 serving as a reference, an angle number is determined from this calculated angle. Then, the corresponding voice address is determined by means of the character code and angle number. The voice address and voice are associated with each other. For example, in the case where the voice address is "a", a voice "good afternoon" is outputted, and in the case where the address is "b", a voice "good bye" is outputted.

In FIG. 26, an angle number is determined by 90 degrees, i.e., in four directions. In this case, angle information is expressed by two bits. However, in the present invention, an angle number may be determined in an arbitrary number of directions without being limitative thereto. For example, in the case of eight directions, an angle number is provided by 45 degrees, and angle information is expressed on a three by three bits basis. In the case of 16 directions, an angle number is provided by 22.5 degrees, and angle information is expressed by a four by four bit basis.

Figure 27:
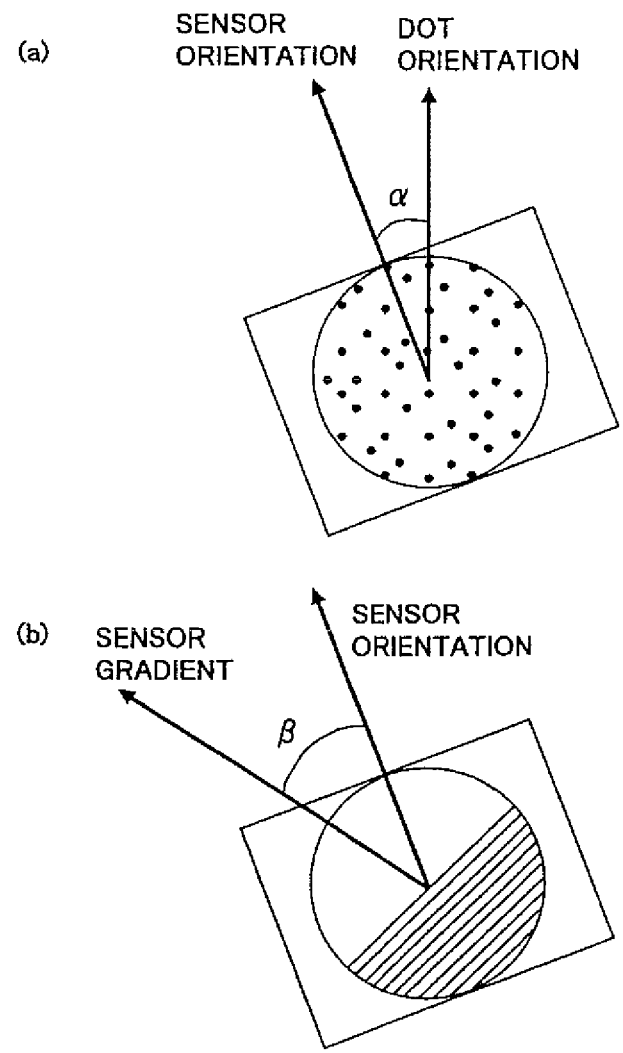
FIG. 27 is a view (2) for explaining a method for detecting an angle.

FIG. 27 is a view illustrating a relationship between a sensor gradient and an angle.

As shown in FIG. 27 (a), an angle formed by a dot pattern orientation and a sensor orientation is defined as "α". In addition, as shown in FIG. 27 (b), an angle formed by a sensor gradient and a sensor orientation is defined as "β". In this case, an angle "γ" formed by a dot orientation and a sensor gradient is obtained as an angle obtained by tilting a figure. In other word, the angle "γ" is obtained by equation $\gamma = \alpha + \beta$.

<In the Case where Angle Parameter is Off>

Next, a description will be given with respect to procedures for playing back a voice linked with a dot pattern in the case where an angle parameter is OFF.

When a user clicks a symbol of angle parameter OFF key 805, an angle parameter is turned OFF. Next, when a sensor of base 2001 reads a dot pattern on the bottom face of figure 2003 placed on a stage, a central processing unit (MPU) analyzes the dot pattern by means of analysis software, and then, converts the analyzed pattern to a dot code (code information). Then, a search is made for a memory link table based on the dot code, and then, a voice file track corresponding to this dot code is read out. In the case where a plurality of voices are linked with the dot code at a different angle, the lastly recorded voice is read out.

<Operation Through Connection to Personal Computer>

While, in the embodiment described above, operation has been carried out with the use of instruction board 800, the present invention is not limitative thereto.

Figure 28:
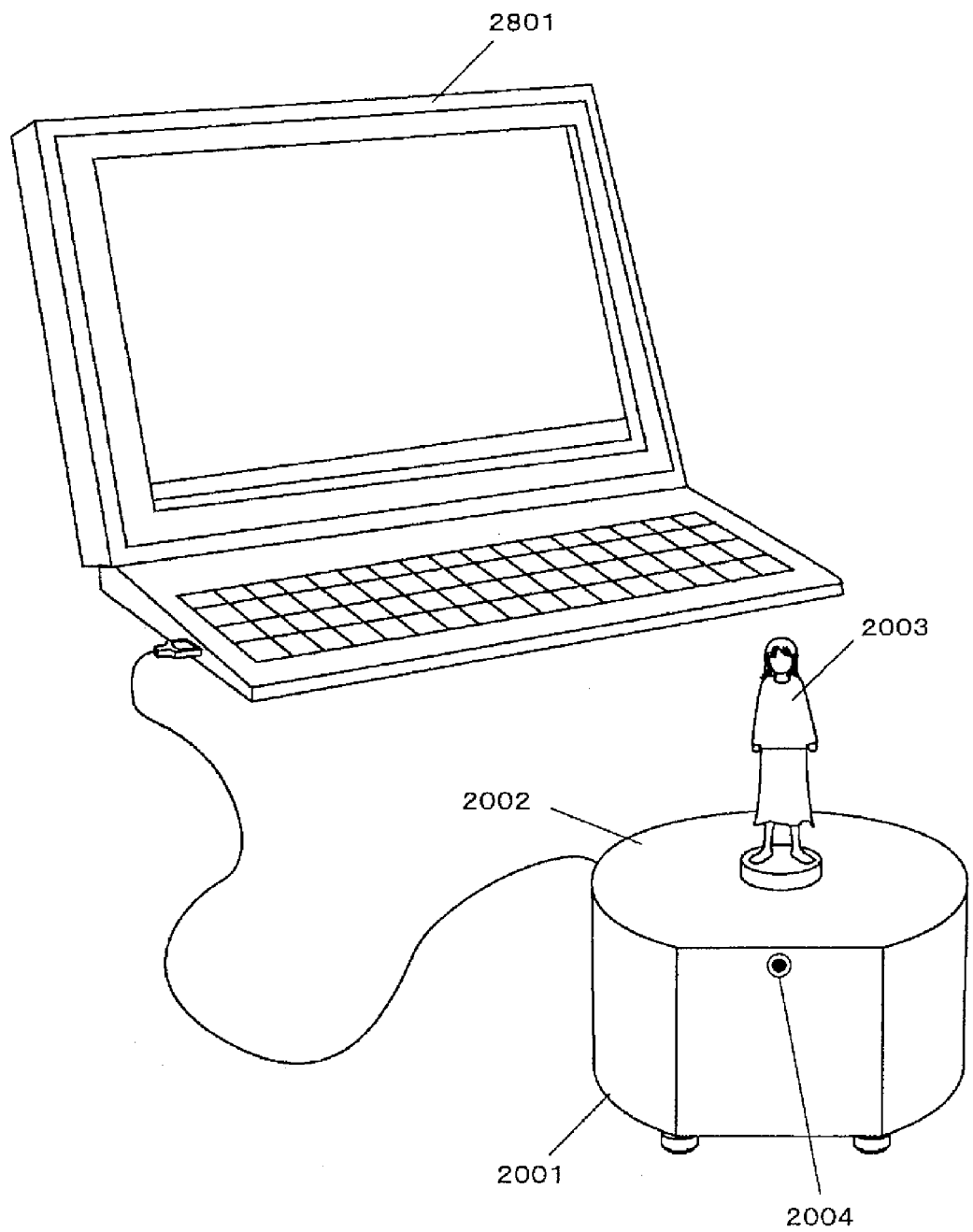
FIG. 28 is a view (1) for explaining another embodiment of a voice recorder having a function of detecting an angle.

For example, as shown in FIG. 28, base 2001 may be connected to personal computer 2801 with the use of a connector. In this case, a user carries out operations such as recording, reproduction, and linking with the use of a keyboard and a mouse (not shown).

<Operation while Button is Provided on Base>

Figure 29:
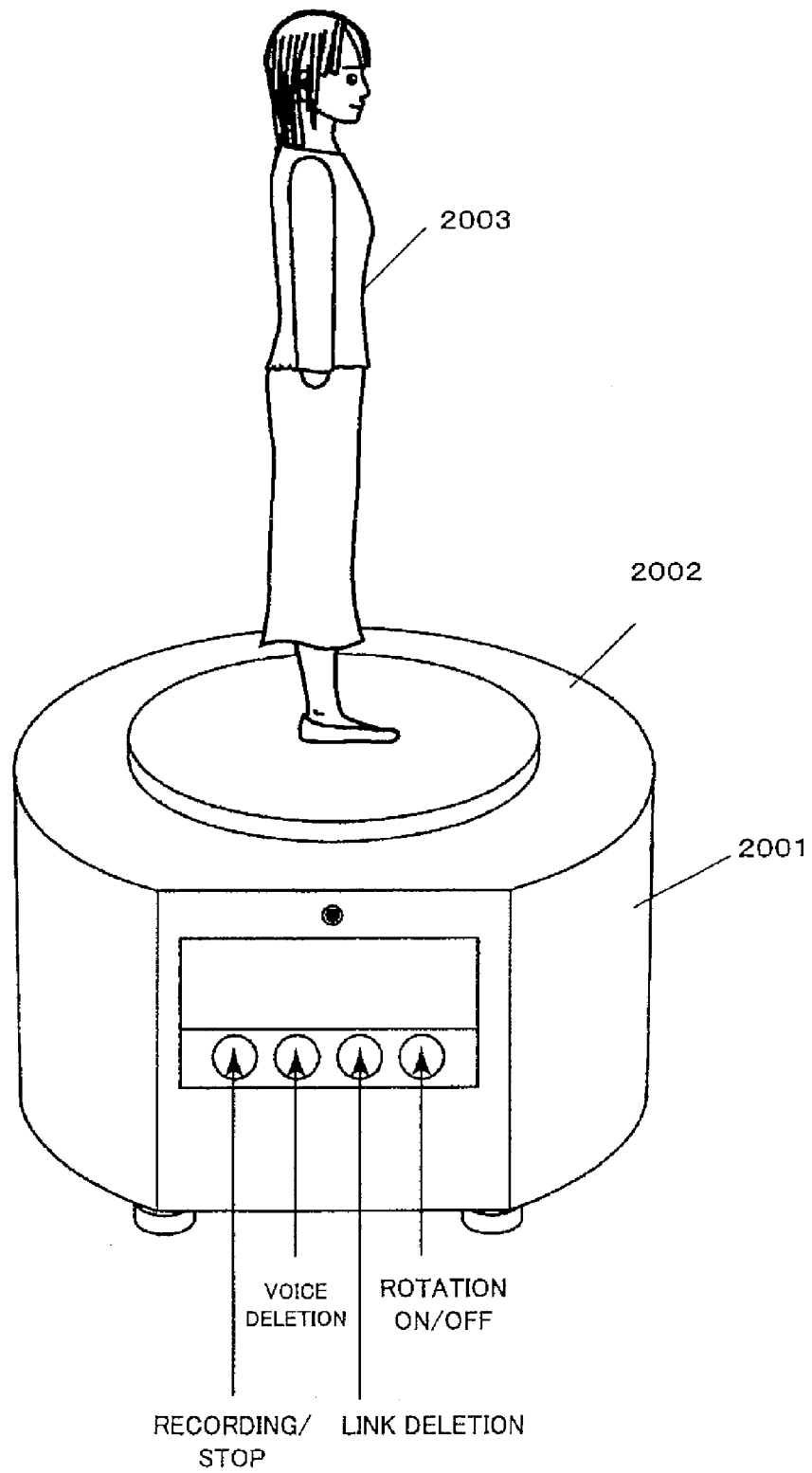
FIG. 29 is a view (2) for explaining another embodiment of a voice recorder having a function of detecting an angle.

In addition, as shown in FIG. 29, this voice clock per se is made connectable to a USM terminal of personal computer 2801 so that voice control or alarm time setting and the like may be carried out on the personal computer side. In this case, liquid crystal display portion 2005 provided on base 2001 may be eliminated.

Figure 30:
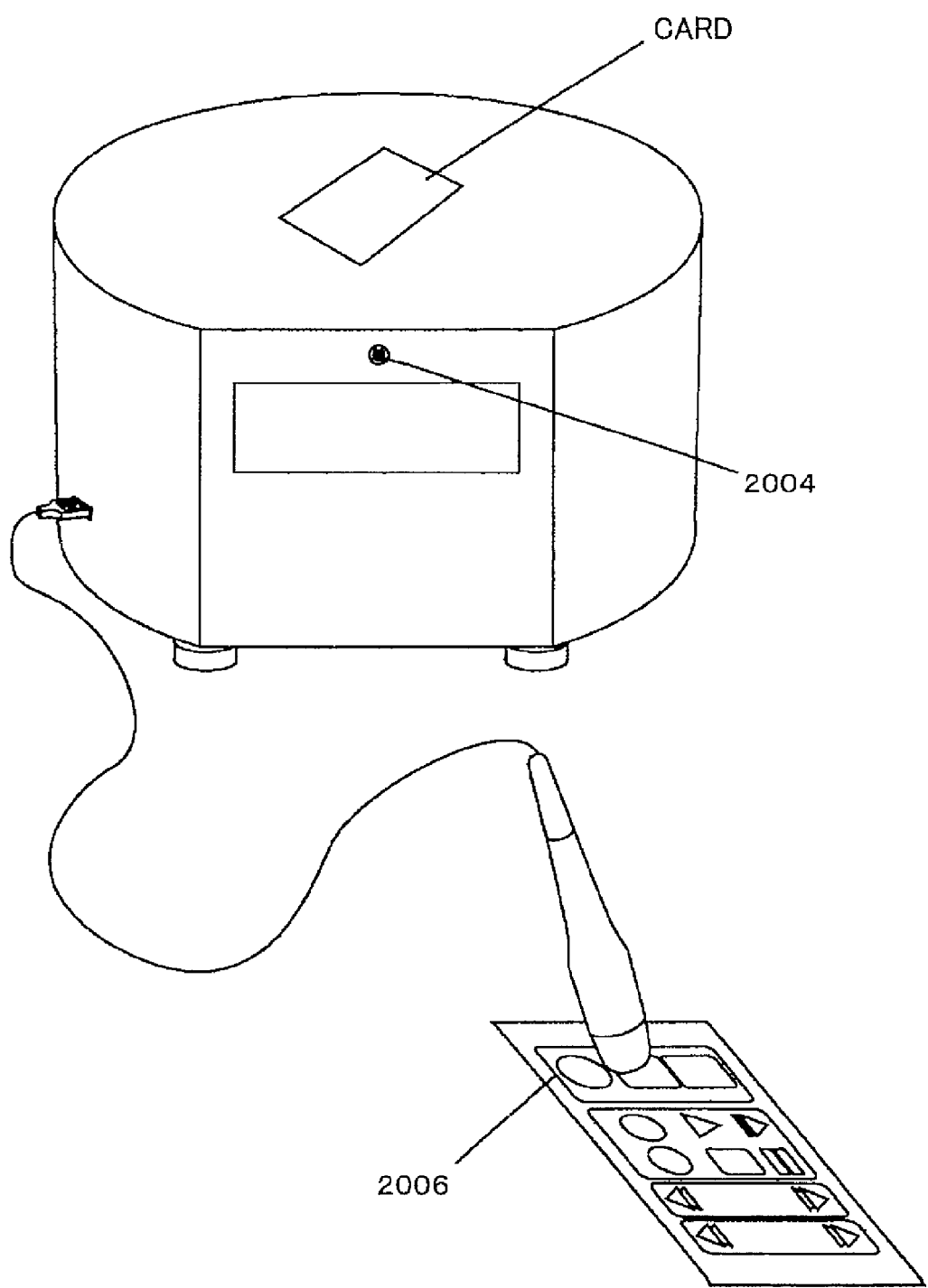
FIG. 30 is a view (3) for explaining another embodiment of a voice recorder having a function of detecting an angle.

In addition, as shown in FIG. 30, a card is placed on base 2001, so that the operation described above may be carried out by way of reading a dot pattern printed on a card.

<Voice Recorder with Voice Recognition Function>

Figure 31:
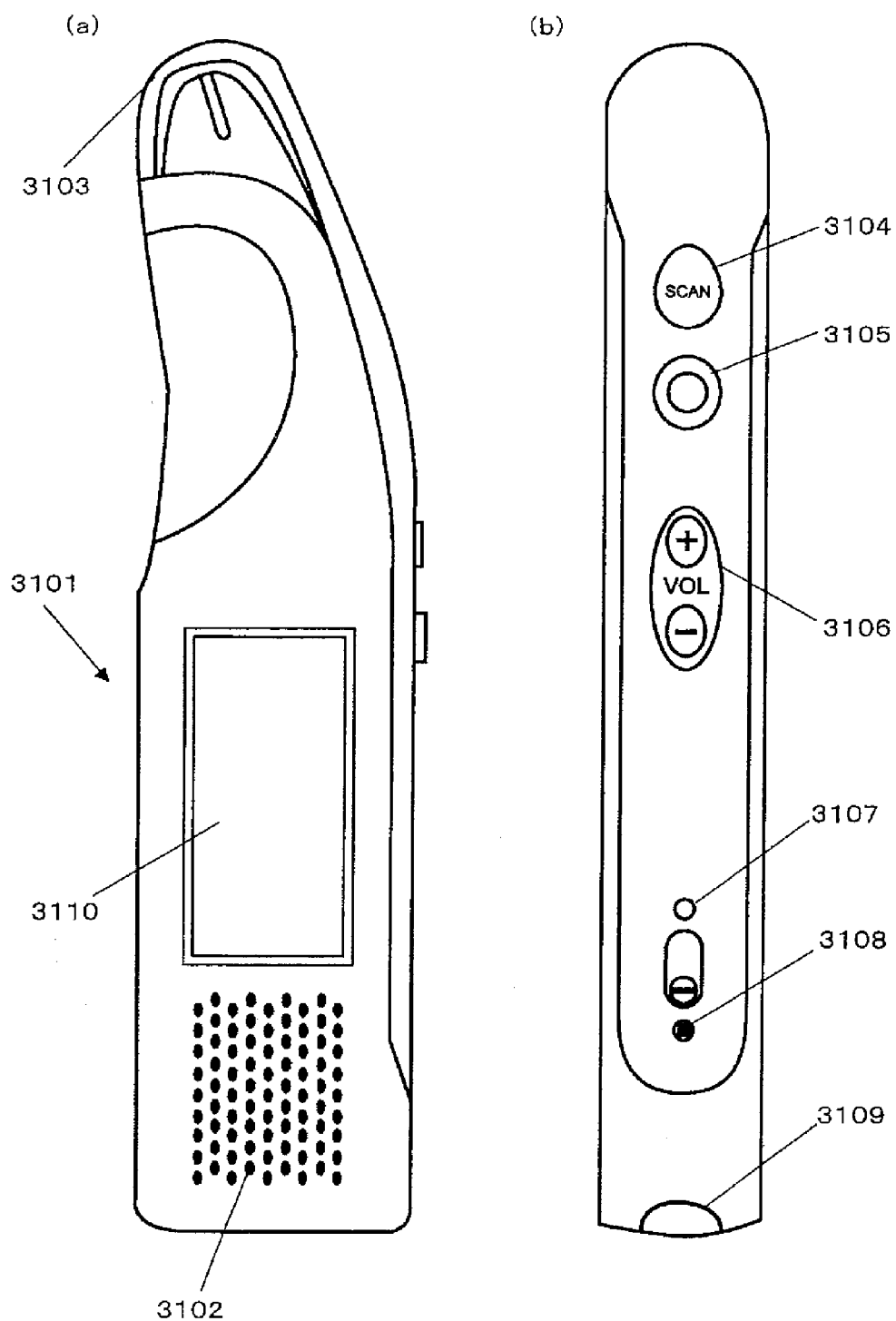
FIG. 31 is a view for explaining another embodiment of the present invention.

FIG. 31 shows another embodiment of a voice recorder with which a scanner is integrated.

This voice recorder 3101 has an input function for voice recognition and liquid crystal display screen 3110 in addition to a function of an integrated voice recorder shown in FIG. 19.

In this voice recorder 3101, record button 3105 is compatible with a voice input button. In the case where the voice recorder is employed as a voice input device, the voice information is inputted in voice recorder 3101 by generating a voice toward microphone 3108 while the record button 3105 is held down.

After this generated voice information has been digitally converted by means of an A/D converter, although is not shown, in a voice recorder, the converted information is analyzed by means of a voice recognition circuit, and then, the analyzed information is converted to text information corresponding to generated voice information.

For example, in the case where schedule information such as business trip is registered in advance, when a user generates a voice "schedule" or "plan" while record button 3105 is held down, this voice is analyzed by means of a voice recognition circuit, and then, the analyzed data is converted to text data "schedule" or "planning". With these text data being a search key, a search is made for a database constructed in a memory, and then, text information "business trip to OO" is extracted. This text information is converted to voice information, and then, a voice "business trip to OO" is generated from speaker 3102.

In a database, voice information "business trip to OO" per se is stored in a memory, and date information (April 28, for example) may be associated with this information in text.

In this case, this voice is converted to text data merely by generating a voice "April 28" relative to voice recorder 3101, and then, a search is made for a database, whereby voice information "business trip to OO" corresponding to this text data may be outputted from speaker 3102.

While, in the example described above, a description was given with respect to a case in which data found out by making a search for a database in a voice recorder based on inputted voice information is generated as a voice from speaker 3102, the voice recorder may be used as only an input device for voice recognition or may be used as a voice recognition terminal equipped with a scanner function while a recording function is eliminated. In addition, a plurality of voice recorders are connected to a personal computer, so that voice mail exchange may be made.

For example, when voice information generated as a voice is inputted while a user holds down record button 3105, a central processing unit (MPU) of the voice recorder transmits this voice information from antenna 3109 to a personal computer through a communication interface, although not shown, and then, analyzes the voice information by means of a voice recognition program in a personal computer. With this analyzed information to text data, a search is made for a database constructed in a personal computer or a database on a network, whereby a search result may be outputted to a display unit of the personal computer.

In addition, search result data is transmitted to a voice recorder with the use of a communication function, whereby voice information may be generated as a voice from speaker 3102 of a voice recorder.

Figure 32:
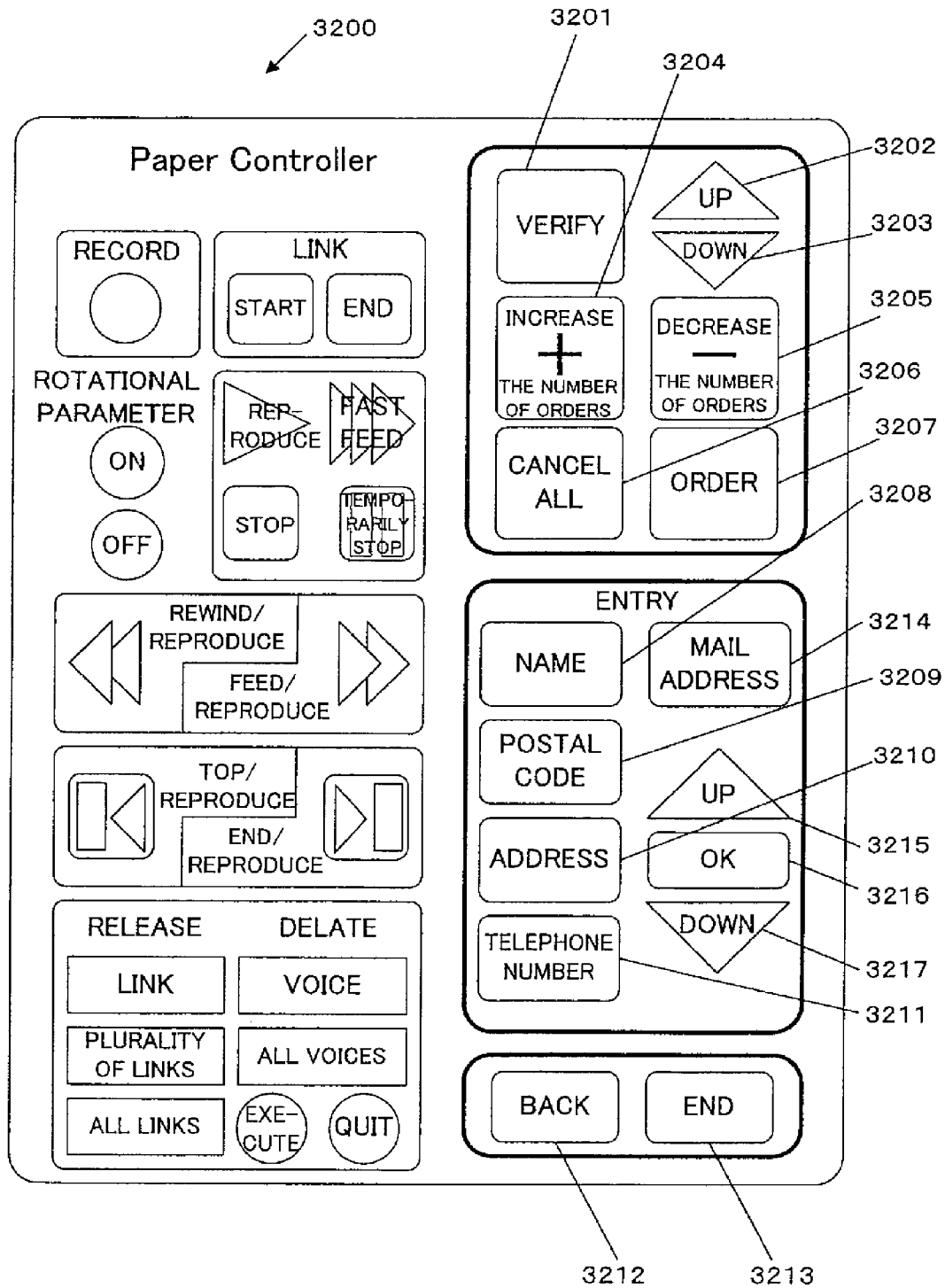
FIG. 32 is a view showing a state in which symbols of an instruction board for use in Examples of FIG. 31 are laid out.

FIG. 32 shows a configuration of paper controller 3200 for enhancing this voice recognition precision and for classifying inputted voice information.

As shown in the figure, on this paper controller 3200, an input voice generation category such as area "name entry" (3208), area "postal code entry" (3209), area "address entry" (3210), area "telephone number entry" (3211), and area "mail address entry" (3214) are printed, respectively. In these areas, different codes are printed as a dot pattern, respectively. In addition, areas "Up", "Determine", and "Down" are printed as input functions similarly so that candidates or menus displayed on a display screen can be selected.

In other words, when a voice is inputted while record button 3105 of this voice recorder 3101 is pressed, a category code (dot pattern) is scanned in advance by means of sensor unit 3103, thereby enhancing voice recognition precision and classifying inputted voice information.

For example, in the case where a voice "Ueno" has been generated, it is difficult to grasp whether the generated voice is Ueno as a name of place or Ueno as a person's name. However, in the case where a voice "Ueno" has been inputted as voice information after "address entry" has been scanned, categories of address entry and voice information on the "Ueno" are transmitted to a personal computer.

In a central processing unit (MPU) of a personal computer, a category code of address entry is added, thereby making it possible to judge that the voice information on the "Ueno" is a category of "address". Thus, map information on Ueno and its neighboring area can be displayed immediately on a display screen of a personal computer.

A communication destination of a voice recorder is not imitative to such a personal computer, and may be any equipment such as a car navigation system, an information home electronics, a control device, or a robot. Namely, this voice recorder is employed as an input device of a voice recognition function, thereby making it possible to control any kind of information device or information home electronics.

Next, with reference to an example of the present embodiment, a description will be given with respect to a case of carrying out voice recognition with the use of instruction board (paper controller) 3200 shown in FIG. 32.

Instruction board 3200 is used for order placement from a communication sale catalog. In a communication sale catalog (not shown), dot patterns are printed on a product photograph in a superimposed manner. When a user clicks a product photograph by means of sensor unit 3102 of voice recorder 3101 (a dot pattern of the photograph portion is picked up as an image by means of a sensor unit), a screen of product description corresponding to valid codes of the dot pattern is displayed on a display screen of a personal computer (not shown). In addition, a dot pattern is printed in a superimposed manner at a portion at which a catalog product number is printed. When a print face of product number is clicked, ordered product information is displayed on a display screen of a personal computer, and then, the clicked product is registered in an order list. Next, when verify key 3201 is clicked, an order list is displayed on a screen. In the case where the product registered in an order list is selected, when symbols of "Up" software key 3202 and "Down" software key 3203 are clicked, an order list is displayed on a screen. In the case where the number of orders is changed, symbols of increasing the number of orders 3204 or decreasing the number of orders 3205 are clicked. In the case where the order list of the registered product is determined, cancel-all software key 3206 is clicked. In the case where the product and quantity to be ordered has been determined, order placement software key 3207 is clicked. In addition, return key 3212 is clicked to revert to the lastly browsed product catalog screen. In the case where an order program is terminated, exit key 3213 is clicked. In the case where these operations are carried out, a user clicks a desired product photograph and symbol while scan button 3104 is held down.

A user enters a name and an address or the like after a product to be ordered has been determined. When the user clicks name entry key 3208 while scan button 3104 is held down, the dot pattern is analyzed by means of a central processing unit (MPU) incorporated in scanner 3101, and then, the analyzed pattern is converted to a dot code (code information). When this dot code is transmitted to a central processing unit (MPU) of a computer, a voice recognition mode is turned ON based on the dot code.

Next, the user generates one's name as a voice toward microphone 3108 while record button 3105 is held down. Then, the central processing unit (MPU) digitally converts the voice generated toward the microphone by means of an A/D converter (not shown), and then, compresses and/or converts the converted voice by means of a compressor circuit. Such compressed data is transmitted to a computer through antenna 3109. A central processing unit (MPU) of a computer analyzes the voice data by means of voice analysis software, converts the analyzed data to character information, and then, displays the character information on a screen. By way of similar operation, postal number, address, and telephone number are also inputted by means of a voice input function.

By providing such a voice input function, a user can input information such as address by means of simple operation without carrying out complicated operation employing a keyboard or a scanner.

In the present embodiment, as described previously, only when a dot pattern is clicked in a state in which scan button 314 is held down, a dot pattern is read. Although an LED and a CMOS sensor or the like are incorporated in sensor unit 3103, these elements cause power consumption. Further, because the voice recorder 3101 is wireless, idling power is required for always maintaining a communication function. Therefore, batteries (including battery charger) are also used, and a need exists for restraining consumption of the power.

Therefore, in order to minimize power consumption, only in the case where scan button 3104 is held down, power is supplied to sensor unit 3103 so as to be functioned.

In addition, in a voice recognition function as well, only while record button 3105 is held down, voice entry is carried out. If voice entry is always carried out, there is a possibility that microphone 3108 recognizes a voice that is not to be inputted by a user, and user information is unintentionally inputted. Voice entry is carried out only while voice entry button 3105 is held down so that a user can input only desired information.

In voice recorder 3101 shown in FIG. 31, antenna 3109 is provided so as to make communication with a personal computer in a wireless communication system. In this manner, while voice information and dot pattern-read code information are transmitted to the personal computer side, only voice information or only code information may be transmitted to a personal computer, <Voice Mail System>

FIG. 33 to FIG. 39 are views, each of which describes a voice mail system employing a voice recorder in the present invention.

Figure 33:
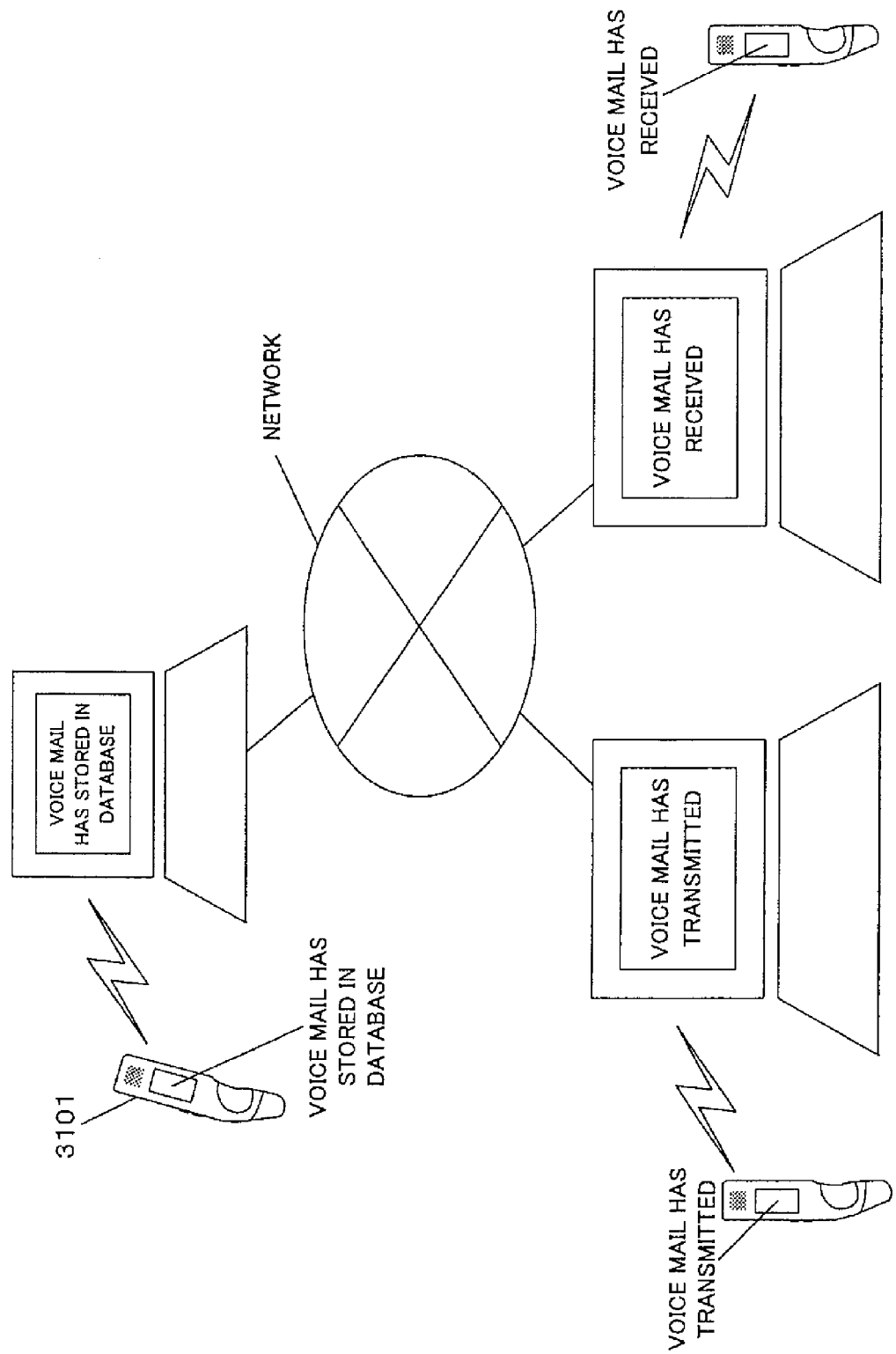
FIG. 33 is a schematic view of a network in a voice mail system according to one embodiment of the present invention.

FIG. 33 is a view of a network configuration in the present embodiment. In the voice mail system of the present invention, a personal computer is connected to another personal computer via a network such as the Internet, enabling data transmission or receiving. These personal computers enable communication with the voice recorder by means of a short distance wireless communication system such as Blue tooth. Communication between a voice recorder and a personal computer may serve as any communication such as wired connection by means of infrared-ray communication, wireless LAN, or USM cable without being limitative to such Blue tooth.

Figure 34:
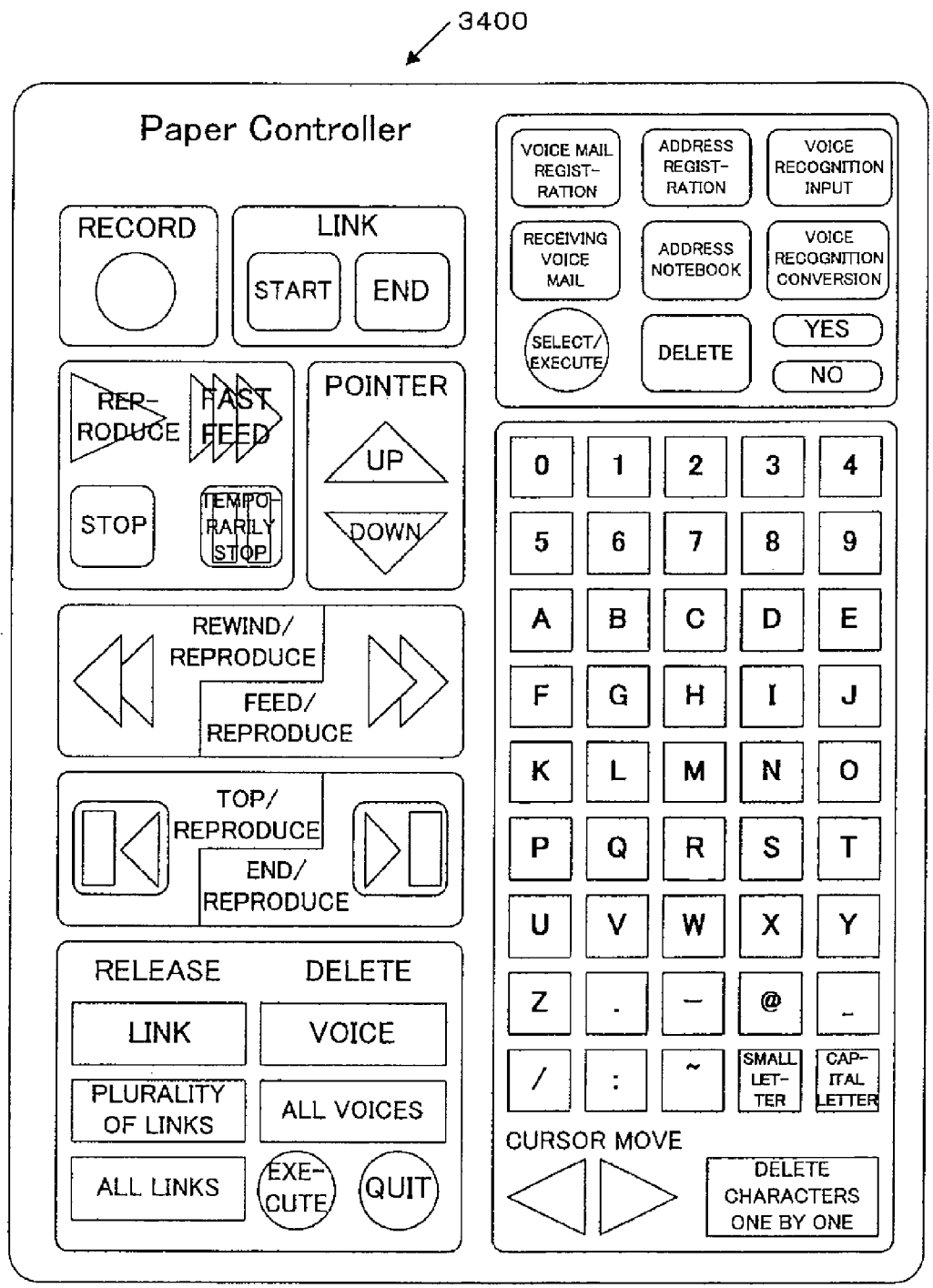
FIG. 34 is a view showing a state in which symbols of a paper controller for use in a voice mail system are laid out.

FIG. 34 is a view illustrating paper controller 3400 employed when a user carries out voice mail registration and transmission/receiving or the like.

Symbols for carrying out voice recording, reproduction, and linking is printed at the left part of paper controller 3400, and symbols for carrying out voice mail transmission/receiving or the like are printed at the right side thereof.

Figure 35:
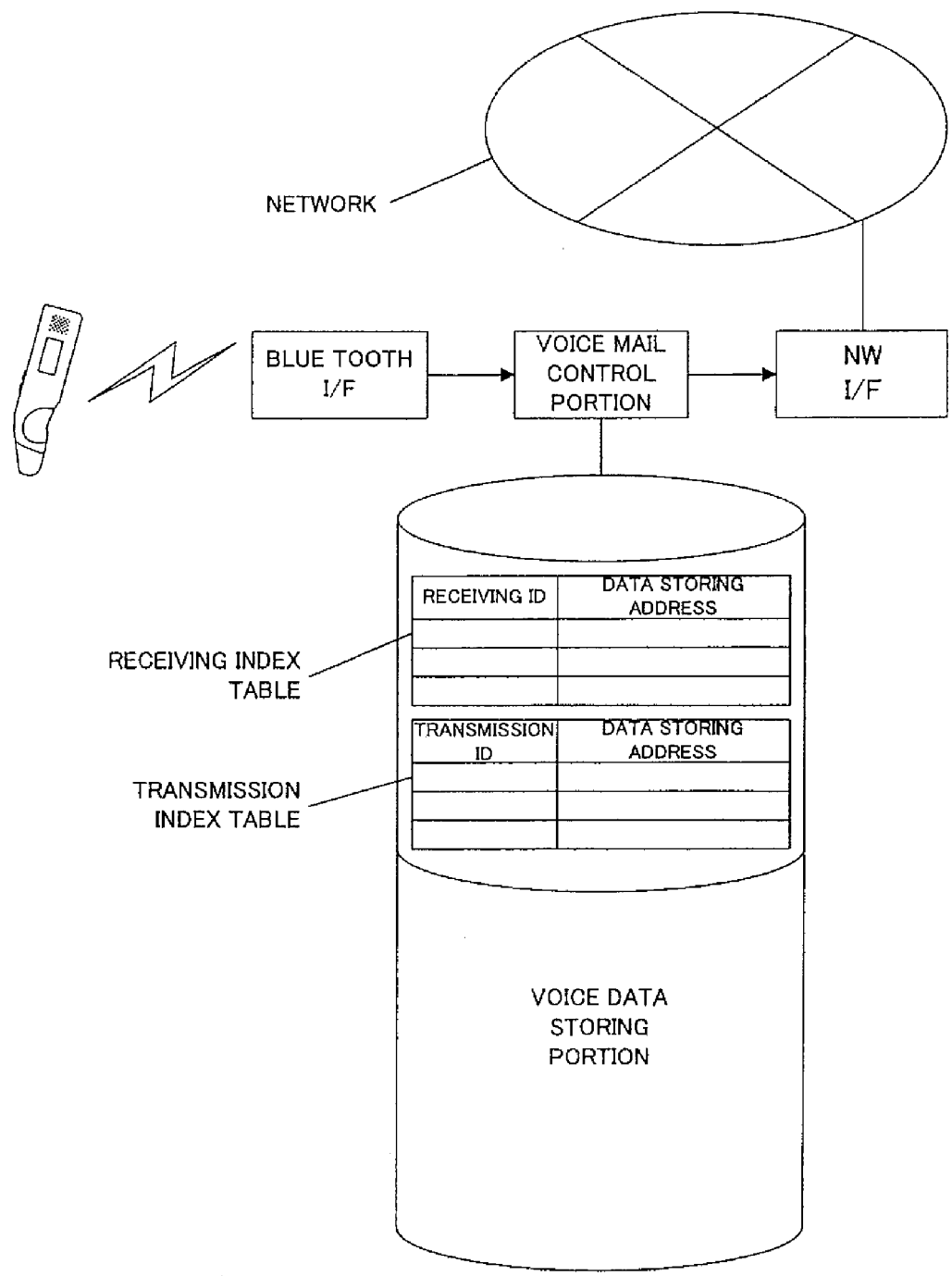
FIG. 35 is a view for explaining a voice mail database.

FIG. 35 is an illustrative view of a voice mail database.

The figure shows a system of transmitting/receiving a voice mail, i.e., voice data inputted by means of a voice recorder while voice recorders carries out communication with a voice mail control portion via a Blue tooth interface (I/F).

The voice mail control portion is comprised of a network connectable universal server or personal computer, and a voice data storing portion is provided in a hard disk device connected to this server or personal computer.

A receiving index table and a transmission index table are provided in the voice data storing portion. Receiving ID (address of transmission source or ID number of receiving voice recorder) and a data storing address are registered to be associated with each other in the receiving index table. In addition, transmission ID (address of transmission destination or ID number of voice recorder serving as a transmission destination) and a data storing address are registered to be associated with each other in the transmission index table.

In other words, a voice mail control portion is designed to registered in the receiving index table, a voice recorder's ID to be managed by the voice mail control portion and register in the receiving index table of the voice data storing portion of one's down, a voice mail of which receiving ID defined for the voice recorder is defined as an address.

On the other hand, when a voice mail is inputted from a voice recorder managed by the voice mail control portion, transmission ID (address of transmission source or ID of voice recorder serving as a transmission destination) is temporarily registered in the transmission index table. Thereafter, the voice mail control portion periodically provides an access to the transmission index table. In the case where there is a voice mail that is not transmitted, such voice mail is transmitted to a voice mail control portion, although is not shown, for managing transmission ID via a network interface (NW I/F) and a network.

Figure 36:
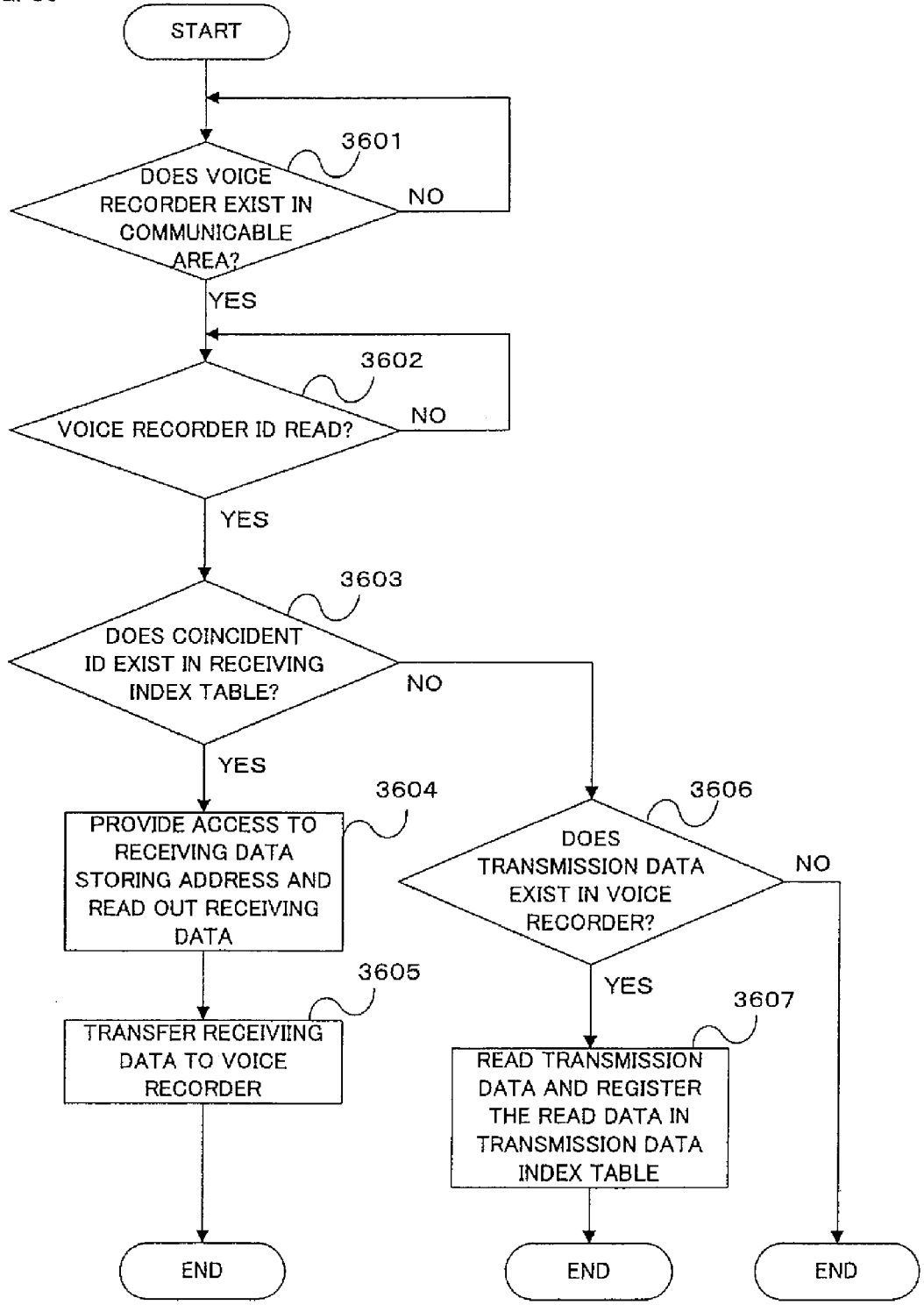
FIG. 36 is a flow chart showing a processing operation of transmitting and receiving a voice mail.

FIG. 36 is a flow chart illustrating transmission/receiving of data between a voice recorder and a personal computer (voice mail control portion).

First, it is judged whether or not a voice recorder is present in a communicable area (3601). If a voice recorder is laid out in the vicinity of a personal computer, voice recorder ID is transmitted to the personal computer by means of a short distance wireless communication system such as Blue tooth.

In the case where this voice recorder ED has been transmitted, it is judged that a voice recorder is present in a communicable area.

Next, it is judged whether or not voice recorder ID has been read (3602). A personal computer reads voice recorder ID via Blue tooth I/F.

Next, it is judged whether or not ID coincident with a receiving index table is present (3603). A control portion judges whether or not ID coincident with read voice recorder ID exists in a receiving index table contained in a voice data database. In the case where the judgment result is affirmative, an access is provided to a data storing address corresponding to receiving ID, and receiving data is read out (3604). Then, the read out receiving data is transferred to a voice recorder via a Blue tooth interface (I/F) (3605), and this processing is terminated.

On the other hand, when a voice mail has been inputted from a voice recorder managed by a voice mail control portion, transmission ID (address of transmission destination or ID of voice recorder serving as a transmission destination) is temporarily registered in a transmission index table. Then, the voice mail control portion periodically provides an access to a transmission index table and transmits voice mail data to a voice mail control portion, although not shown, for managing transmission ID, via a network interface (NW I/F) and a network in the case where there exists a voice mail that has not been transmitted yet.

FIG. 36 is a flow chart illustrating transmission and receiving of data between a voice recorder and a personal computer (voice mail control portion).

First, it is judged whether or not a voice recorder is present in a communicable area (3601). When the voice recorder is laid out in the vicinity of the personal computer, voice recorder ID is transmitted to the personal computer by means of a short distance wireless communication system such as Blue tooth. In the case where this voice recorder ID has this voice recorder ID, it is judged that the voice recorder is present in the communicable area.

Next, it is judged whether or not voice recorder ID has been read (3602). The personal computer reads voice recorder ID via a Blue tooth interface (I/F).

Next, it is judged whether or not ID coincident with a receiving index table is present (3603). A control portion judges whether or not ID coincident with the read voice recorder ID exists in the receiving index table in a voice data database. In the case where it has been judged that receiving ID exists, an access is provided to a data storing address corresponding to receiving ID, and then, receiving data is read out (3604). Then, the read out receiving data is transferred to the voice recorder via the Blue tooth interface (I/F) (3605), and then, this processing is terminated.

On the other hand, in the case where ID coincident with the receiving index table is not present, it is judged whether or not transmission data is present in the voice recorder (3606). In the case where transmission data is present, transmission data, i.e., a transmission destination address and voice data are read, and then, the read data is registered in a transmission index table in a database (3607). When registration has completed, this processing is terminated.

Figure 37:
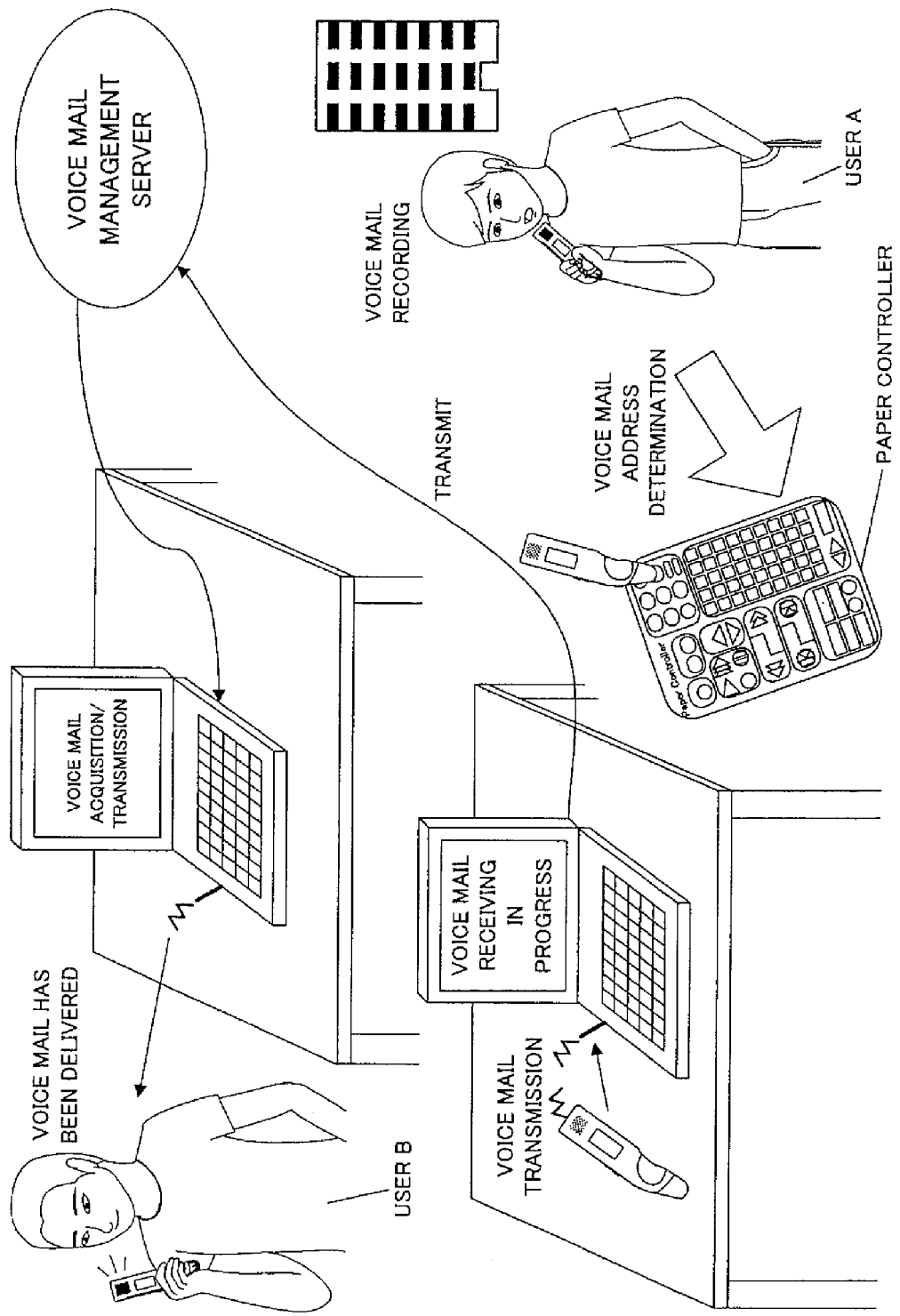
FIG. 37 is a view for explaining transmission/reception of a voice mail.
Figure 38:
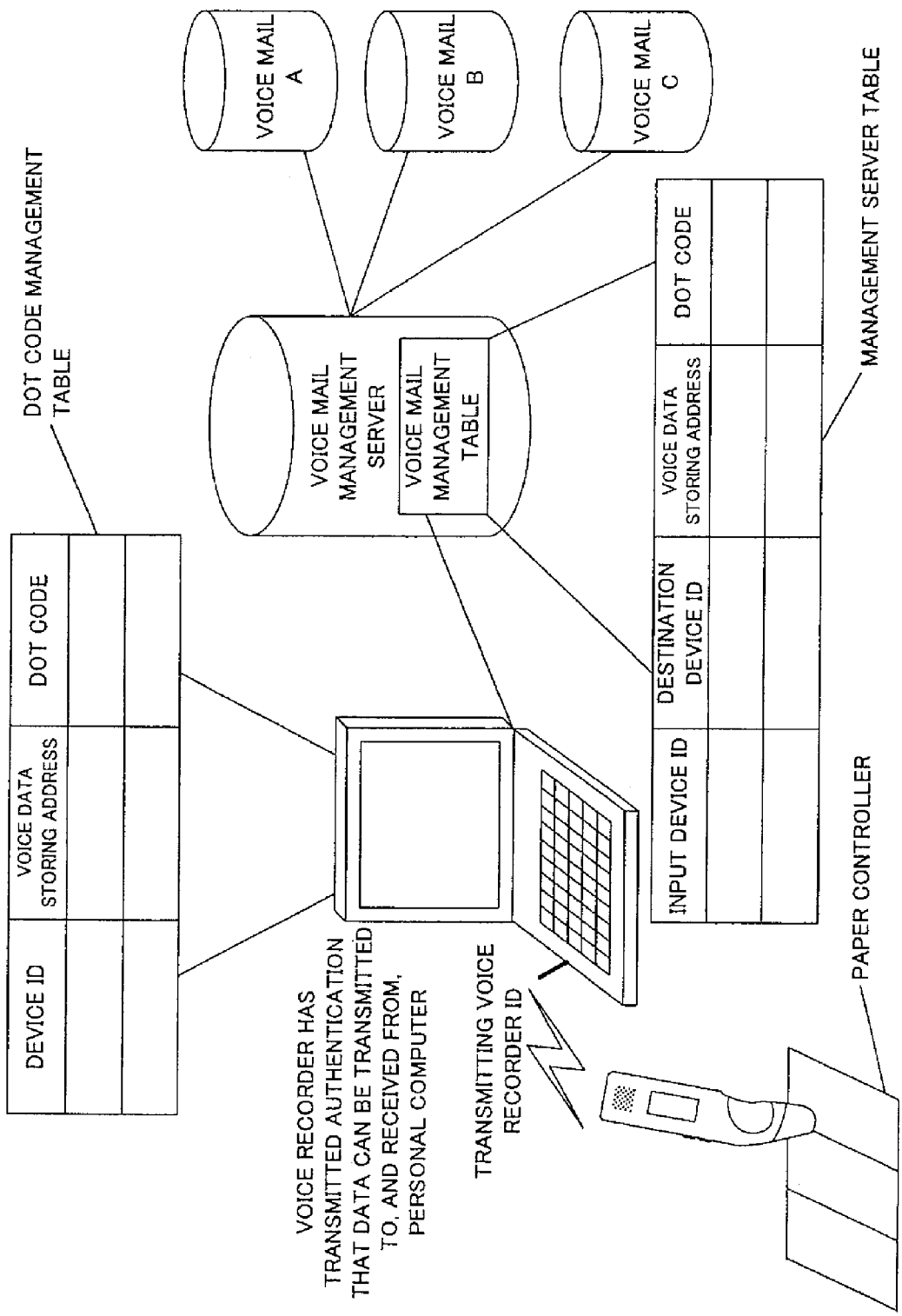
FIG. 38 is a view for explaining a voice mail manager according to one example of a voice mail system.

FIG. 37 shows a specific example of carrying out transmission and receiving of a voice mail between users. In the figure, as shown in FIG. 38 as well, there is shown a system in which a voice mail management server is connected onto a network to integrally manage a voice mail.

When a user A issues a voice to be inputted toward a microphone of a voice recorder outside, voice data is stored as digital data in the memory via the microphone of the voice recorder.

Next, the user A determines a transmission destination of a voice mail. In other words, the user inputs a transmission destination address by employing a paper controller. The inputted address is registered in a memory of the voice recorder.

When the user A carries out a process for transmitting a voice mail at home or in workplace, first, the user lays out a voice mail in the vicinity of a personal computer. By means of a Blue tooth communication function, the personal computer reads device ID defined by voice recorder, i.e., voice recorder ID. Next, the voice data and mail addresses stored in the memory are transmitted to the personal computer.

Upon the receipt of voice data and a mail address, the personal computer displays a message "voice mail receiving in progress" on a monitor (display device). Then, the voice data and mail addresses are transmitted to a voice mail management server.

The voice mail management server registers the received voice data and address in a database in the server. Then, this server transmits the voice data to the corresponding mail address via a network interface (I/F). The personal computer having received the voice mail displays a message "voice mail acquisition/transmission" on a monitor (display device). Then, the personal computer transmits the voice data to a voice recorder of a user B through a Blue tooth interface (I/F). Upon the receipt of voice data, this voice recorder notifies to the user B a message "voice mail has been delivered" by voice and/or on a monitor of the voice recorder. In this manner the user B receives a message transmitted by the user A.

FIG. 38 shows an example of using a voice recorder together with a voice mail management server by means of a control program (voice mail manager) installed in a personal computer (PC).

A user executes on the personal computer (PC) an installation program downloaded by providing an access to CD-ROM or a distribution server of the Internet, and then, registers a voice mail manager as a resident program on an OS (Operating System).

Next, when a voice recorder is laid out in the vicinity of the personal computer (PC), voice recorder ID is transmitted to the personal computer by means of a short distance wireless communication system such as Blue tooth. A central processing unit (CPU) in the personal computer (PC) authenticates voice recorder ID in a voice mail management server. In other words, the CPU authenticates whether or not the transmitted voice recorder ID is ID of a voice recorder that is capable of transmitting and receiving data with the use of the personal computer (PC).

In the case where the authentication result is affirmative, it is verified whether or not the voice mail transmitted to the voice recorder ID is stored, referring to a voice mail management table (dot code management table) in the personal computer (PC).

In the case where the verification result is affirmative, the central processing unit (CPU) reads out the voice mail, and then, transmits the read out voice mail by means of a short distance wireless communication system such as Blue tooth.

Next, a receiver can hear a voice mail by playing back the voice data received (downloaded) from the personal computer by means of the voice recorder.

In the case where a voice mail is not stored in a voice mail management table (dot code management table), reference is made to a voice mail management server on the Internet. If a voice mail transmitted to the voice recorder ID is stored in a voice mail management table of a voice mail management server, the voice mail is read out and downloaded in the personal computer (PC).

When a voice mail required by personal computer managing a voice recorder has been downloaded in the personal computer (PC), additional data on a voice mail management table for starting up the voice mail (voice data storing address or dot code) are also downloaded together with the voice mail. Subsequently, all of the downloaded data is managed by means of only the voice mail management table in the personal computer.

Therefore, in the case where voice recorder ID identical to that described previously has been then transmitted, no access is provided to the voice mail management server over the Internet again. A voice mail downloaded in a hard disk unit (ED) of the personal computer is read out based on a voice mail management table including newly added data.

In the case where a transmission processing operation using a voice recorder is carried out, the personal computer makes Blue tooth communication with the voice recorder, and then, reads voice recorder ID (device ID) and reads a voice mail stored from a memory of the voice recorder when a voice recorder managed by the personal computer per se has been laid out in the vicinity thereof. At this time, a dot code obtained when a dot pattern has been scanned at the time of recording using a voice recorder is registered in association with device ID.

Then, by means of batch processing, the personal computer periodically provides an access to a voice mail management server, and then, transmits data contained in the voice mail management data to a voice mail server. Upon the receipt of the data, the voice mail management server updates one's down voice mail management table based on the received data.

<Voice Recognition Data Communication>

Figure 40:
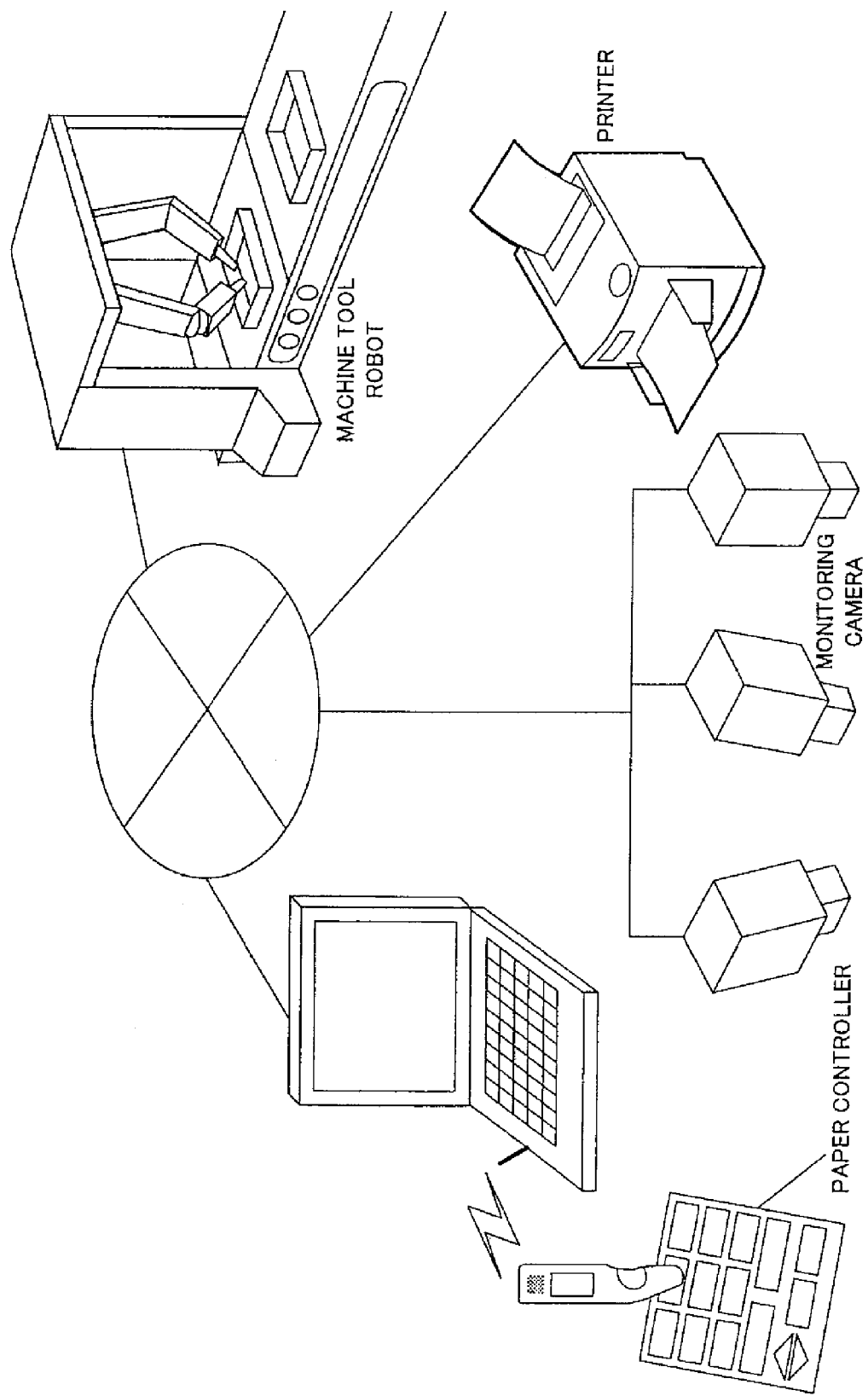
FIG. 40 is a view for explaining equipment control by means of voice recognition data communication according to one embodiment of the present invention.
Figure 41:
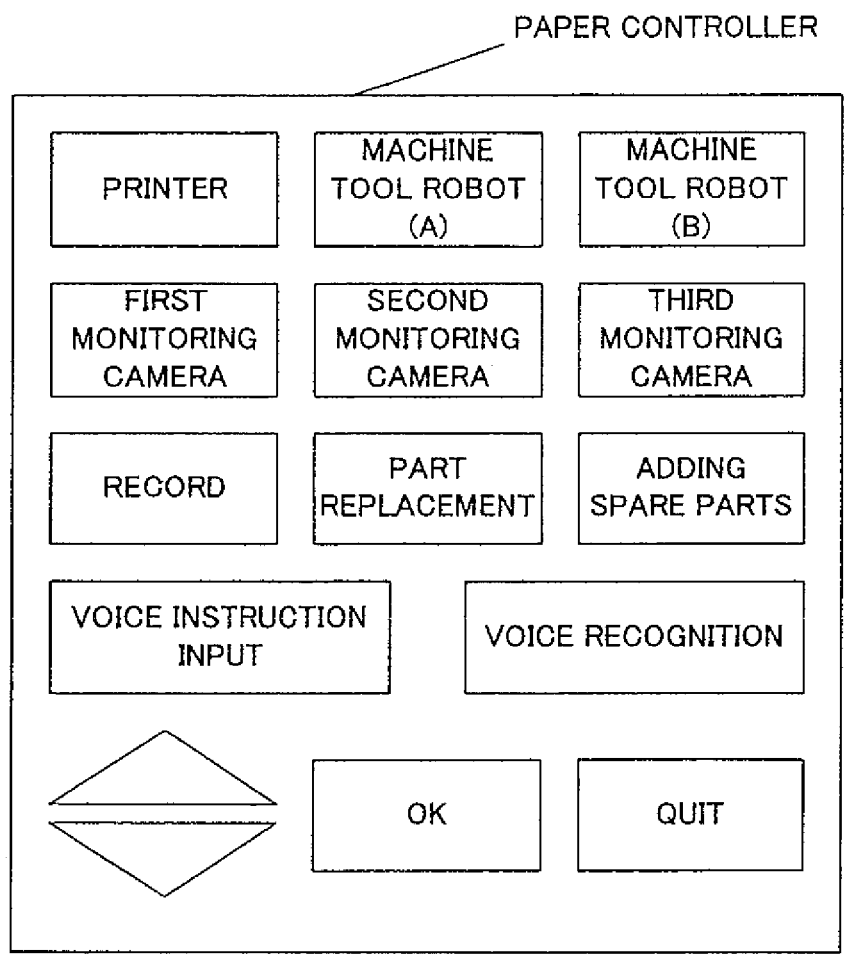
FIG. 41 is a view showing a state in which symbols of a paper controller for use in equipment control are laid out.

FIG. 40 describes an embodiment of the present invention. In the present invention, voice recognition data communication is carried out, thereby making it possible to carry out a variety of control operations. FIG. 40 shows a specific example in the case where factory control is carried out as one example thereof FIG. 41 shows a paper controller employed at the time of control operation.

As described above, apart from the aspects described in the present embodiment, the present invention can also be applied as a control technique of a voice recorder for the sake of interview. For example, an interviewer may carry out voice recognition control by means of the paper controller shown in FIG. 34 using a voice recorder for interview.

In addition, the voice recorder described in FIG. 37 and FIG. 38 has a function of transmitting and receiving voice data via a network, thus making it possible to use the voice recorder as a terminal equipped with a microphone and a speaker of an IP telephone, for example. In this case, in the case where a voice recorder is always laid out in the vicinity of a personal computer, the voice recorder can be used as an ordinary IP telephone terminal, thus eliminating a built-in memory for storing voice data. By allocating such a memory, however, even when a user is in distant location such that communication with a personal computer cannot be made, a voice mail can be registered in the voice recorder. In this case, when a voice recorder is laid out in the vicinity of the personal computer, a voice mail can be automatically transmitted or received by means of a voice mail manager or the like installed in the personal computer through Blue tooth communication.

Figure 39:
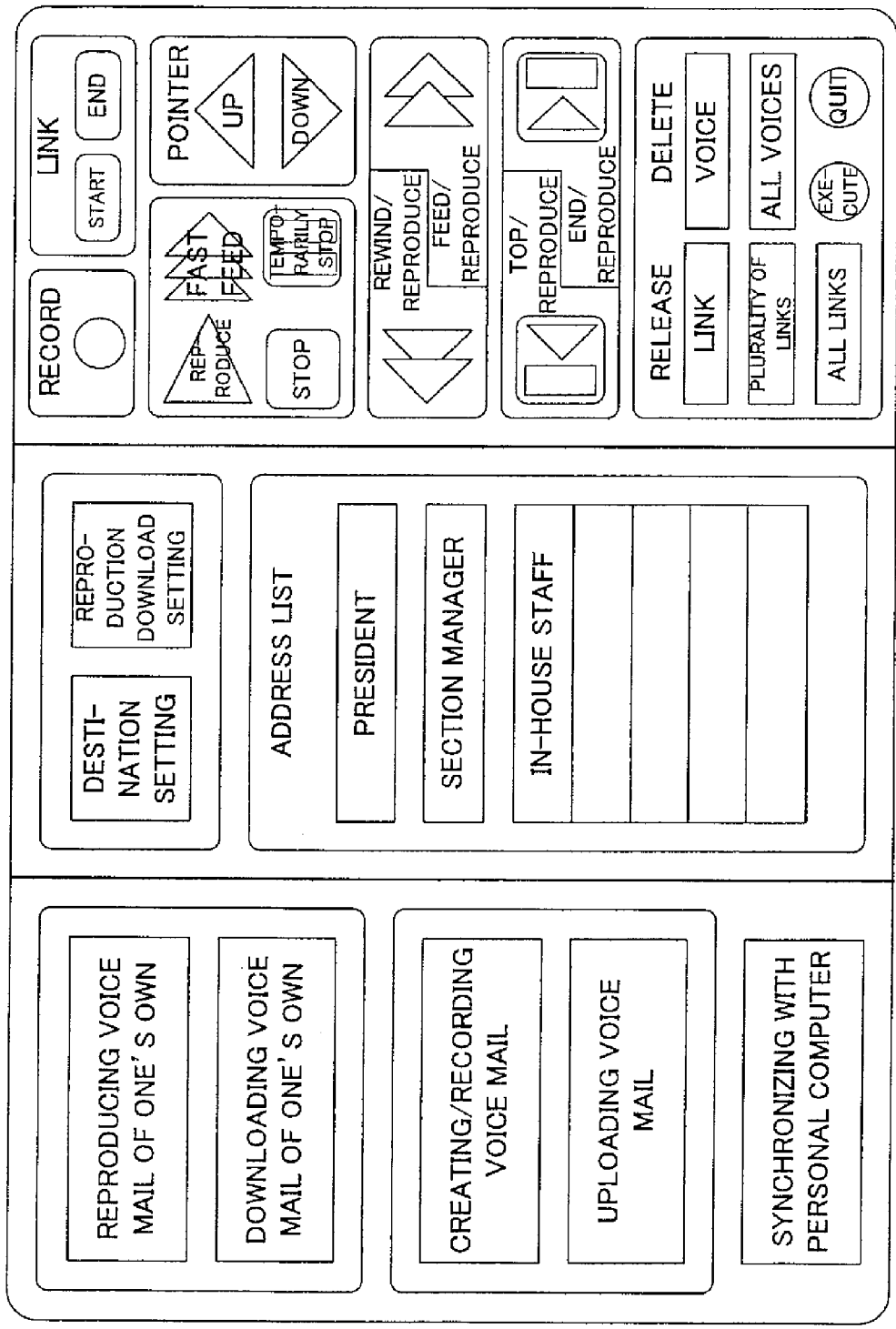
FIG. 39 is a view showing a state in which symbols of a paper controller for use in a voice maul manager are laid out.

FIG. 39 shows a paper controller employed in such usage, wherein it is possible to reproduce or download a voice mail addressed to oneself received by a personal computer.

In addition, a voice mail can be created/registered or uploaded relative to a personal computer.

Further, an area having registered therein a dot pattern of a mode (synchronized with personal computer) for synchronizing a voice mail in a personal computer and the contents of a memory of a voice recorder is also provided.

INDUSTRIAL APPLICABILITY

The present invention is directed to association between a medium such as a picture book, a photograph, a card, or seal and reproduction of voice information and can be utilized as a voice recorder, a voice reproduction device, or an input device for voice recognition.

The invention claimed is:

1. A voice information recording apparatus, comprising:
   a voice information inputting device configured to input voice information;
   a memory configured to store the inputted voice information;
   an optical reader configured to read a dot pattern printed in advance;
   a first processor configured to convert the dot pattern read by the optical reader to at least one of code information and coordinate information;
   a second processor configured to receive at least one of code information and coordinate information corresponding to a dot pattern that is read by the optical reader after the inputted voice information is stored, to associate the at least one of code information and coordinate information corresponding to the dot pattern that is read by the optical reader after the inputted voice information is stored with the inputted stored voice information, and to register the associated the at least one of code information and coordinate information corresponding to the dot pattern that is read by the optical reader after the inputted voice information is stored and the inputted stored voice information in a link table provided in the memory, and
   wherein the second processor is configured to reproduce the voice information by retrieving the voice information from the memory associated by means of the link table in response to reading the dot pattern again by the optical reader after the at least one of code information and coordinate information has been associated with the voice information.

2. The voice information recording apparatus according to claim 1, wherein the link table associates plural items of the at least one of code information and coordinate information with one item of voice information.

3. The voice information recording apparatus according to claim 1, wherein the memory configured to store the inputted voice information is a card type storing medium.

4. The voice information recording apparatus according to claim 3, further comprising independent of an equipment main body, a printing medium having printed thereon a dot pattern that can be read by the optical reader as the second processor configured to instruct the associated or dissociated at least one of code information and coordinate information and the voice information.

5. The voice information recording apparatus according to claim 1, further comprising independent of an equipment main body, a printing medium having printed thereon a dot pattern that can be read by the optical reader in order to instruct the starting of input of the voice information; termination of input of voice information; reproduction of voice information; stopping the reproduction of voice information and other voice information-related operations.

6. The voice information recording apparatus according to any one of claims 1 to 5, wherein the first processor is configured to, in an image storing area for storing as pixels the dot pattern having an orientation depending on a positional relationship between the medial face and the optical reader, the dot pattern being acquired by the optical reader, calculate an angle formed by a positive X-direction or a positive Y-direction of an XY coordinate that is based on the pixels stored therein and an orientation of the dot pattern, and the second processor is configured to enable reproduction of the voice information different depending on angle information in addition to the at least one of code information and coordinate information.

7. A voice information recording and reproducing method, comprising:
inputting voice information with a voice information input device;
storing the inputted voice information in a memory;
reading a dot pattern printed in advance by an optical reader;
converting the dot pattern read by the optical reader to at least one of code information and coordinate information;
receiving at least one of code information and coordinate information corresponding to a dot pattern that is read by the optical reader after the inputted voice information is stored, and associating the at least one of code information and coordinate information corresponding to the dot pattern that is read by the optical reader after the inputted voice information is stored with the inputted stored voice information;
registering the associated the at least one of code information and coordinate information corresponding to the dot pattern that is read by the optical reader after the inputted voice information is stored and the inputted stored voice information in a link table provided in the memory; and
reproducing the voice information by retrieving the voice information from the memory associated by means of the link table in response to reading the dot pattern again by the optical reader after the at least one of code information and coordinate information has been associated with the voice information.

8. A voice information recording apparatus, comprising:
a voice information inputting device configured to input voice information;
a memory configured to store the inputted voice information;
an optical reader configured to read a dot pattern printed in advance;
a first processor configured to convert the dot pattern read by the optical reader to at least one of code information and coordinate information;
a second processor configured to associate the inputted stored voice information with the at least one of code information and coordinate information corresponding to a dot pattern that is read by the optical reader after the inputted voice information is stored; and
a link table, provided in the memory, that contains the associated at least one of code information and coordinate information and the stored voice information, and
wherein the second processor is configured to reproduce the voice information by retrieving the voice information from the memory associated by means of the link table in response to reading the dot pattern again by the optical reader after the at least one of code information and coordinate information has been associated with the voice information, and wherein, when the optical reader reads the dot pattern in the midst of inputting of the voice information by the voice information input device, the inputting of the voice information terminates and association of the voice information with the at least one of code information and coordinate information is performed by the second processor.

9. A voice information recording and reproducing method, comprising:
inputting voice information with a voice information input device;
storing the inputted voice information in a memory;
reading a dot pattern printed in advance by an optical reader;
converting the dot pattern read by the optical reader to at least one of code information and coordinate information;
associating the inputted stored voice information with the at least one of code information and coordinate information corresponding to a dot pattern that is read by the optical reader after the inputted voice information is stored;
containing the associated at least one of code information and coordinate information and the voice information in a link table; and
reproducing the voice information by retrieving the voice information from the memory associated by means of the link table in response to reading the dot pattern again by the optical reader after the at least one of code information and coordinate information has been associated with the voice information,
wherein, when the optical reader reads the dot pattern in the midst of inputting of the voice information by the voice information input device, the inputting of the voice information terminates and the associating of the voice information with the at least one of code information and coordinate information is performed.

10. A voice information recording apparatus, comprising:
a voice information inputting device configured to input voice information;
a memory configured to store the inputted voice information;
an optical reader configured to read a dot pattern printed in advance;
a first processor configured to convert the dot pattern read by the optical reader to at least one of code information and coordinate information;
a second processor configured to associate the inputted stored voice information with the at least one of code information and coordinate information corresponding to a dot pattern that is read by the optical reader after the inputted voice information is stored, the at least one of code information and coordinate information corresponding to the dot pattern that is read by the optical reader after the inputted voice information is stored being unassociated with the voice information at the time the dot pattern is read; and
a link table, provided in the memory, that contains the associated at least one of code information and coordinate information and the stored voice information, and
wherein the second processor is configured to reproduce the voice information by retrieving the voice information from the memory associated by means of the link table in response to reading the dot pattern again by the optical reader after the at least one of code information and coordinate information has been associated with the voice information.

11. A voice information recording and reproducing method, comprising:

inputting voice information with a voice information input device;

storing the inputted voice information in a memory;

reading a dot pattern printed in advance by an optical reader;

converting the dot pattern read by the optical reading means to at least one of code information and coordinate information by a first processor;

associating the inputted stored voice information with the at least one of code information and coordinate information corresponding to a dot pattern that is read by the optical reader after the inputted voice information is stored, the at least one of code information and coordinate information corresponding to the dot pattern that is read by the optical reader after the inputted voice information is stored being unassociated with the voice information at the time the dot pattern is read;

containing the associated at least one of code information and coordinate information and the voice information in a link table; and reproducing the voice information by retrieving the voice information from the memory associated by means of the link table in response to reading the dot pattern again by the optical reader after the at least one of code information and coordinate information has been associated with the voice information.

\* \* \* \* \*